(12) United States Patent
Shirouzu et al.

(10) Patent No.: US 11,320,831 B2
(45) Date of Patent: May 3, 2022

(54) MOVER, MOVER CONTROL SYSTEM, METHOD OF DETECTING OBJECT BY MOVER, MOVING SYSTEM, AND METHOD OF CONTROLLING MOVER

(71) Applicant: Panasonic Intellectual Property Management Co., Ltd., Osaka (JP)

(72) Inventors: Hiroshi Shirouzu, Shiga (JP); Yoshihiro Ikawa, Osaka (JP); Osamu Mizuno, Nara (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 495 days.

(21) Appl. No.: 16/221,649

(22) Filed: Dec. 17, 2018

(65) Prior Publication Data
US 2019/0227559 A1    Jul. 25, 2019

(30) Foreign Application Priority Data

Jan. 23, 2018 (JP) .............................. JP2018-009205
Jan. 23, 2018 (JP) .............................. JP2018-009207

(51) Int. Cl.
*G05D 1/02* (2020.01)
*G01S 7/00* (2006.01)
(Continued)

(52) U.S. Cl.
CPC .............. *G05D 1/024* (2013.01); *G01S 7/023* (2013.01); *G01S 7/0235* (2021.05);
(Continued)

(58) Field of Classification Search
CPC .... G05D 1/024; G05D 1/0274; G05D 1/0297; G05D 2201/0207; G05D 2201/0216;
(Continued)

(56) References Cited

U.S. PATENT DOCUMENTS 8,494,703 B2 * 7/2013 Barwick .............. B62D 5/0418
701/23
9,720,072 B2 * 8/2017 McCloskey ........... G01S 7/0236
(Continued)

FOREIGN PATENT DOCUMENTS

EP        2851760 A1    3/2015
JP    2009-133875 A    6/2009
(Continued)

OTHER PUBLICATIONS

Japanese Office Action issued in Japanese Patent Application No. JP2018-009207 dated Aug. 10, 2021.
(Continued)

*Primary Examiner* — Joshua E Rodden
(74) *Attorney, Agent, or Firm* — Pearne & Gordon LLP

(57) ABSTRACT

Disclosed herein is a mover including an object detecting unit and either a masking processing unit or a transmission restricting unit as an additional processing unit. The object detecting unit detects an object based on a reception signal output from a receiver unit by having a transmitter unit transmit a scanning wave and by having the receiver unit receive a reflected wave, which is a component, reflected from the object, of the scanning wave. The masking processing unit performs masking processing of masking, in accordance with a timing at which, and/or a direction of incidence in which, a disturbance wave, not depending on the scanning wave, is incident on the receiver unit, a portion of the reception signal output from the receiver unit. The transmission restricting unit restricts a transmission range in which the transmitter unit transmits the scanning wave.

22 Claims, 15 Drawing Sheets

(51) Int. Cl.
  *G01S 17/04* (2020.01)
  *G01S 7/02* (2006.01)
(52) U.S. Cl.
  CPC ............ *G01S 7/0236* (2021.05); *G01S 17/04* (2020.01); *G05D 1/0274* (2013.01); *G05D 1/0297* (2013.01); *G05D 2201/0207* (2013.01); *G05D 2201/0216* (2013.01)
(58) Field of Classification Search
  CPC ........ G01S 17/04; G01S 7/023; G01S 7/0235; G01S 7/0236
  USPC .......................................................... 701/23
  See application file for complete search history.

(56) References Cited

U.S. PATENT DOCUMENTS

| | | | | |
|---|---|---|---|---|
| 10,088,570 | B2* | 10/2018 | Kumagai | ................ G01S 17/89 |
| 10,845,470 | B2* | 11/2020 | Verghese | ............. G01S 17/931 |
| 2009/0096661 | A1* | 4/2009 | Sakamoto | ............. G01S 13/345 |
| | | | | 342/92 |
| 2013/0018630 | A1* | 1/2013 | Chou | ...................... G01S 17/14 |
| | | | | 702/159 |
| 2014/0240161 | A1* | 8/2014 | Davidson | ............. G01S 7/4806 |
| | | | | 342/14 |
| 2017/0123055 | A1* | 5/2017 | Hustava | ................. G01S 15/18 |
| 2018/0188037 | A1* | 7/2018 | Wheeler | ................ G06F 16/29 |

FOREIGN PATENT DOCUMENTS

| | | |
|---|---|---|
| JP | 2012-053838 A | 3/2012 |
| JP | 2014-109548 A | 6/2014 |
| JP | 2017-142659 A | 8/2017 |

OTHER PUBLICATIONS

Japanese Office Action issued in Japanese Patent Application No. JP 2018-009207 dated Feb. 22, 2022.

* cited by examiner

MOVER, MOVER CONTROL SYSTEM, METHOD OF DETECTING OBJECT BY MOVER, MOVING SYSTEM, AND METHOD OF CONTROLLING MOVER

CROSS-REFERENCE TO RELATED APPLICATION

This application claims the benefit of foreign priority to Japanese Patent Application No. 2018-9205 filed on Jan. 23, 2018 and Japanese Patent Application No. 2018-9207 filed on Jan. 23, 2018, the entire contents of which are hereby incorporated by reference.

TECHNICAL FIELD

The present disclosure relates to a mover, a system for controlling the mover, a method of detecting an object by the mover, a moving system, and a method of controlling the mover. More particularly, the present disclosure relates to a mover configured to move around in an object space, a system for controlling the mover, a method of detecting an object by the mover, a moving system, and a method of controlling the mover.

BACKGROUND ART

In the related art, an unmanned carrier vehicle has been known which is designed to move within a traveling area in accordance with route data (see, for example, Japanese Unexamined Patent Application Publication No. 2012-53838 (hereinafter referred to as "D1"). The unmanned carrier vehicle (corresponding to the mover) includes a laser rangefinder sensor with the ability to measure the distance to an object located in an area surrounding the unmanned carrier vehicle. The laser rangefinder sensor (corresponding to a combination of the transmitter unit, receiver unit, and object detecting unit) emits a laser beam and detects a reflected beam (as a reflected wave), thus measuring the distance to the object constituting an obstacle.

In a situation where a plurality of unmanned carrier vehicles of the type disclosed in D1 are operating within the same traveling area, when the laser rangefinder sensor of one of the unmanned carrier vehicles receives a laser beam emitted from the laser rangefinder of another one of the unmanned carrier vehicles, the former laser rangefinder may detect the distance to the object erroneously.

SUMMARY

The present disclosure provides a mover, a system for controlling the mover, a method of detecting an object by the mover, a moving system, and a method of controlling the mover, all of which are configured or designed to reduce the chances of detecting the object erroneously.

A mover according to an aspect of the present disclosure includes a body configured to move around, and an object detecting unit. The object detecting unit is provided for the body and detects an object based on a reception signal output from a receiver unit by having a transmitter unit transmit a scanning wave and by having the receiver unit receive a reflected wave. The reflected wave is a component, reflected from the object, of the scanning wave. The object detecting unit includes an additional processing unit including either a masking processing unit or a transmission restricting unit. The masking processing unit performs masking processing of masking, in accordance with a timing at which, and/or a direction of incidence in which, a disturbance wave, not depending on the scanning wave, is incident on the receiver unit, a portion of the reception signal output from the receiver unit. The transmission restricting unit restricts a transmission range in which the transmitter unit transmits the scanning wave.

A mover control system according to another aspect of the present disclosure includes a plurality of the movers. The mover control system further includes a transmission device configured to transmit masking information, including location information about locations of the plurality of movers, to each of the plurality of the movers. The masking processing unit of each of the plurality of the movers masks, in accordance with the location information, a portion of the reception signal output from the receiver unit.

A method of detecting an object by a mover according to still another aspect of the present disclosure is a method of detecting an object by a mover that moves around in an object space, surrounding the mover, to detect the object. The method includes: making a transmitter unit transmit a scanning wave; making a receiver unit receive an incident wave and output a reception signal representing the incident wave; masking, in accordance with a timing at which, and/or a direction of incidence in which, a disturbance wave, not depending on the scanning wave, is incident on the receiver unit, a portion of the reception signal output from the receiver unit; and detecting the object based on the reception signal that has had a portion thereof masked.

A moving system according to yet another aspect of the present disclosure includes the plurality of movers and a high-order system. Each of the plurality of movers includes a map information generation unit, a map information transmission unit, and a map information reception unit. The map information generation unit generates, based on a result of detection by the object detecting unit, map information for the transmission range. The map information transmission unit transmits the map information, generated by the map information generation unit, to the high-order system. The map information reception unit receives, from the high-order system, integrated map information obtained by integrating the map information generated by the map information generation unit with the map information generated by another one of the plurality of movers other than the mover. The high-order system includes an integrated map information generation unit and an integrated map information transmission unit. The integrated map information generation unit generates the integrated map information by integrating together pieces of the map information generated by the respective map information generation units of the plurality of movers. The integrated map information transmission unit transmits the integrated map information generated by the integrated map information generation unit to the plurality of movers. The mover moves in accordance with the integrated map information received by the map information reception unit.

A mover control method according to yet another aspect of the present disclosure includes determining a transmission range, in which a transmitter unit transmits a scanning wave, so as to restrict the transmission range; making the transmitter unit transmit the scanning wave to the transmission range; and detecting an object by making a receiver unit receive a reflected wave. The reflected wave is a component, reflected from the object, of the scanning wave.

DESCRIPTION OF EMBODIMENTS

First Embodiment (1.1) Overview

Figure 1:
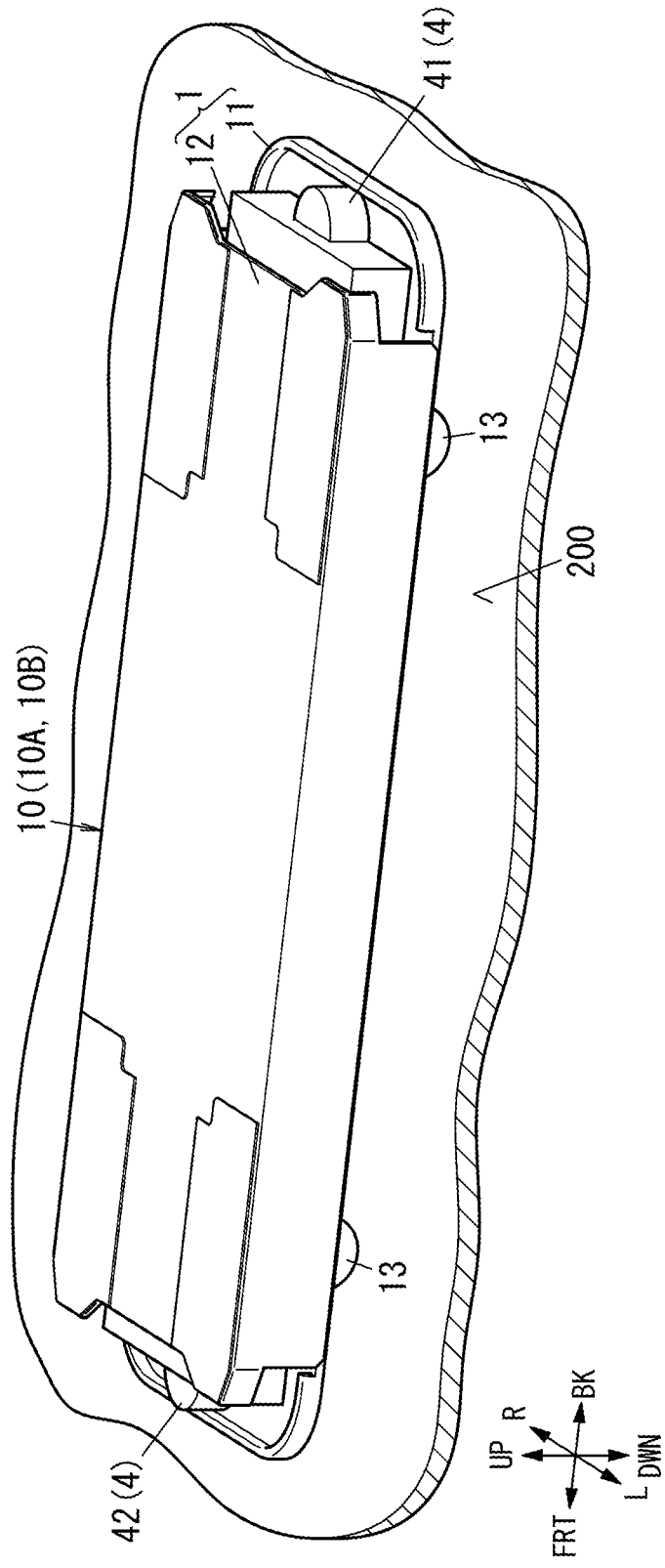
FIG. 1 is a perspective view illustrating the appearance of a mover according to a first embodiment of the present disclosure.
Figure 2:
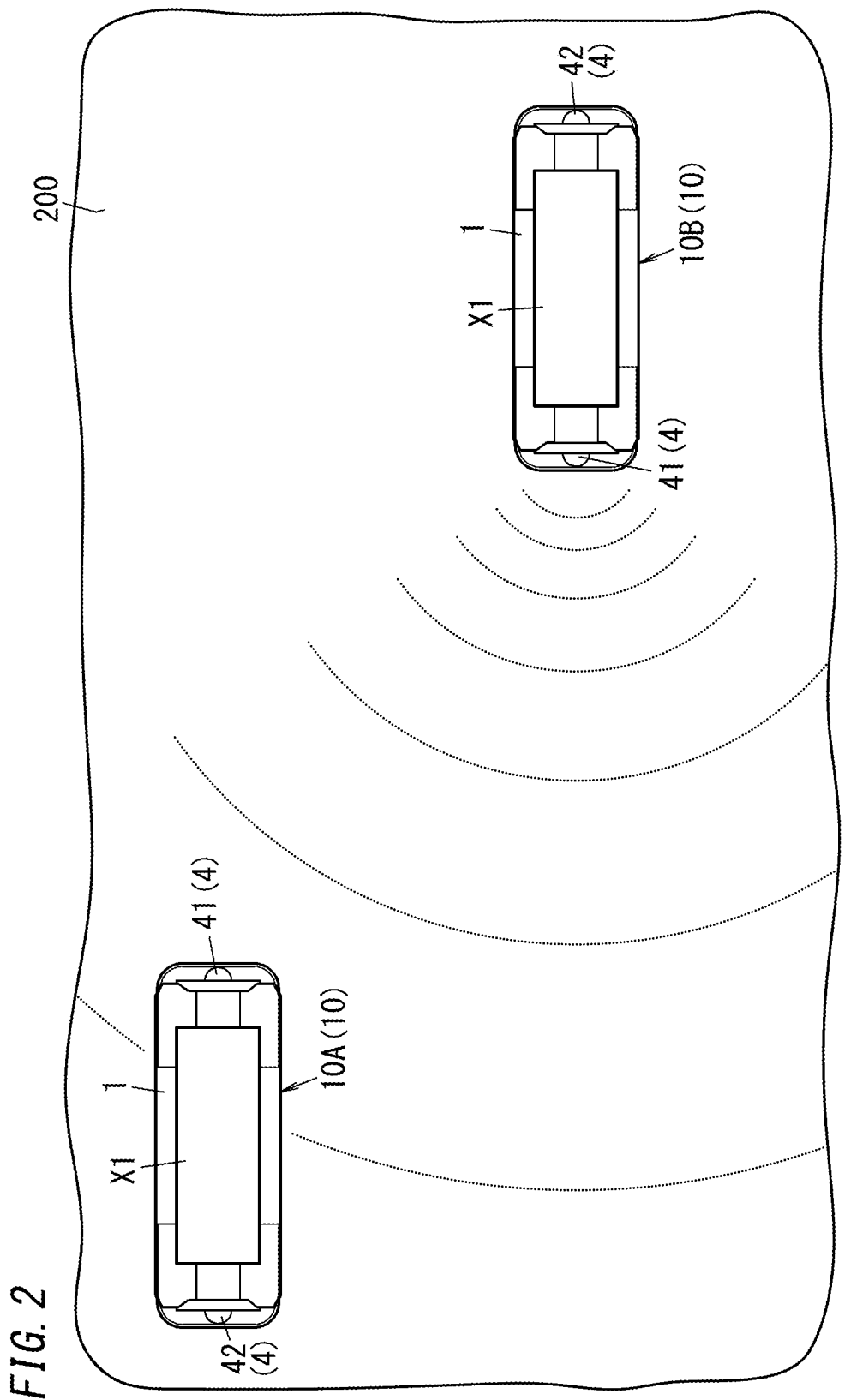
FIG. 2 illustrates an example of how the mover may be used.

A mover 10 according to an exemplary embodiment is a vehicle designed to travel on a traveling surface 200 on a plurality of wheels 13 as shown in FIGS. 1 and 2. The mover 10 may be introduced into distribution centers (including parcel shipping centers), factories, offices, stores, schools, hospitals, and various other facilities and configured to travel on a traveling surface 200 such as the floor surface of a given facility. As used herein, the "traveling surface 200" is a surface on which the mover 10 is designed to move. If the mover 10 moves inside of a facility, the traveling surface 200 may be the floor surface of the facility, for example. On the other hand, if the mover 10 moves outdoors, then the traveling surface 200 may be the ground, for example. In the following description of embodiments, the mover 10 is implemented as a burden carrier for carrying a burden X1 as an example.

In FIG. 2, a plurality of (e.g., two in the example illustrated in FIG. 2) movers 10A, 10B are traveling on the traveling surface 200. These movers 10A, 10B have the same configuration, and will be hereinafter collectively referred to as "movers 10" if there is no need to distinguish these movers 10A, 10B from each other. The number of the movers 10 provided does not have to be two, but may also be one or three or more.

Figure 3:
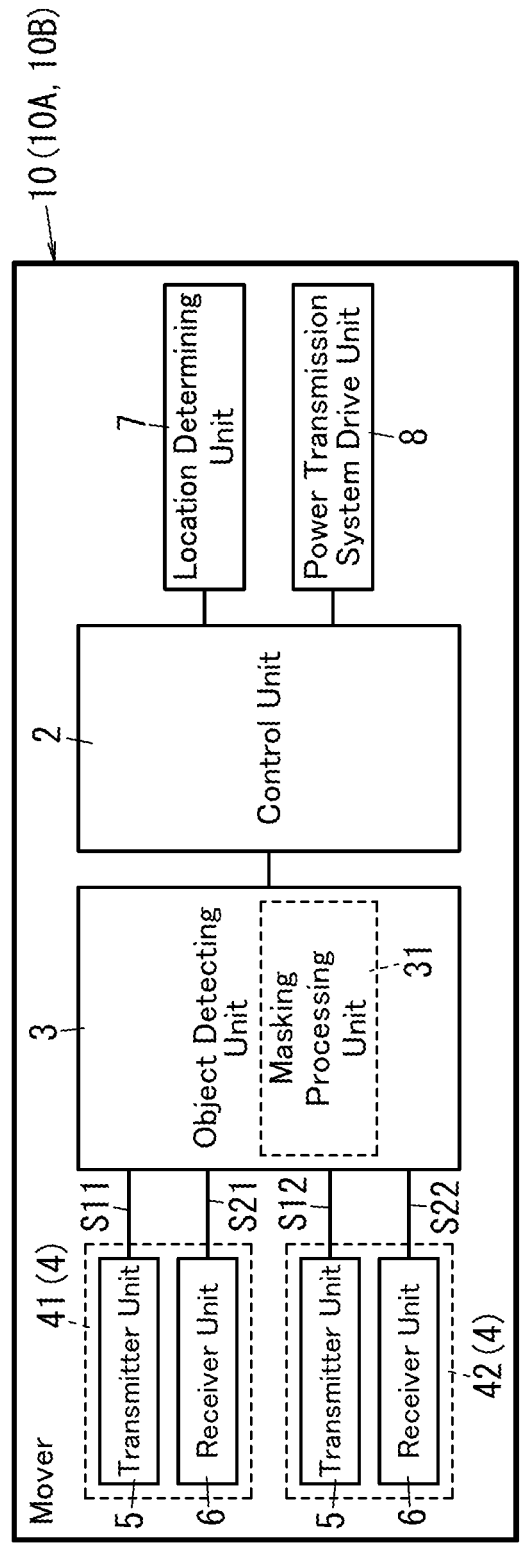
FIG. 3 is a block diagram of the mover.

A mover 10 according to this embodiment includes a body 1 configured to move around, and an object detecting unit 3 (see FIG. 3). The object detecting unit 3 is provided for the body 1 and detects an object based on a reception signal S21, S22 supplied from a receiver unit 6 by having a transmitter unit 5 transmit a scanning wave and by having the receiver unit 6 receive a reflected wave. The reflected wave is a component, reflected from the object, of the scanning wave. The object detecting unit 3 includes a masking processing unit 31. The masking processing unit 31 performs masking processing of masking, in accordance with a timing at which, and/or a direction of incidence in which, a disturbance wave, not depending on the scanning wave, is incident on the receiver unit 6, a portion of the reception signal S21, S22 output from the receiver unit 6.

As used herein, the "scanning wave" refers to at least one of light (light waves), radio waves, or acoustic waves, and is transmitted from the transmitter unit 5 toward the space surrounding the body 1. The reflected wave is produced by having the scanning wave strike, and be reflected from, the object that is present in the space surrounding the mover 10. Meanwhile, the disturbance wave, not depending on the scanning wave, refers herein to a component of an incident wave incident on the receiver unit 6. The disturbance wave is also a component of the scanning wave other than the reflected wave thereof that has struck and been reflected from the object. Furthermore, a portion of the reception signal S21, S22 may be masked by having a switch, for example, provided on a stage preceding an input circuit that receives the reception signal S21, S22, prevent the portion of the reception signal S21, S22 from entering the input circuit or by invalidating the portion of the reception signal S21, S22 input to the input circuit.

In the mover 10 according to this embodiment, when the scanning wave transmitted from the transmitter unit 5 is reflected from the object, the receiver unit 6 outputs the reception signal S21, S22 representing the reflect wave thereof, thus allowing the object detecting unit 3 to detect the object based on the reception signal S21, S22 output from the receiver unit 6. Furthermore, in the mover 10 according to this embodiment, the masking processing unit 31 performs masking processing of masking, in accordance with a timing at which, and/or a direction of incidence in which, the disturbance wave, not depending on the scanning wave, is incident on the receiver unit 6, a portion of the reception signal S21, S22 output from the receiver unit 6. This allows the mover 10 according to this embodiment to reduce the chances of detecting the object erroneously due to the presence of the disturbance wave.

(1.2) Configuration

Next, a configuration for the mover 10 according to this embodiment will be described in detail with reference to FIGS. 1-7. In the following description, unless otherwise stated, the direction perpendicular to the traveling surface 200 (i.e., the vertical direction) will be hereinafter referred to as an "upward/downward direction" and the mover 10 is supposed to be located "over" the traveling surface 200. Also, while the mover 10 is traveling forth, the direction in which the mover 10 goes will be hereinafter referred to as a "forward direction" and the direction that is perpendicular to the upward/downward direction and the forward/backward direction will be hereinafter referred to as a "rightward/ leftward direction." Thus, the upward, downward, leftward, rightward, forward, and backward directions are herein defined just as indicated by the "up," "down," "left," "right," "front," and "back" arrows in FIG. 1 and other drawings. However, these directions are only an example and should not be construed as limiting the directions in which the mover 10 is used. It should also be noted that the arrows indicating the respective directions on the drawings are shown there only for the purpose of description and insubstantial ones. Likewise, the arrows indicating the directions of movements of the body 1 and other members on the drawings are also shown there only for the purpose of description and insubstantial ones as well.

The mover 10 includes the body 1 and the object detecting unit 3 as described above. In addition, the mover 10 according to this embodiment further includes a control unit 2, sensor units 4 (41, 42), a location determining unit 7, and a power transmission system drive unit 8. According to this embodiment, the control unit 2, the object detecting unit 3, the sensor units 4 (41, 42), and the power transmission system drive unit 8 are all mounted on the body 1.

The mover 10 is designed to travel autonomously on a flat traveling surface 200 such as the floor surface of a facility. In this embodiment, the mover 10 is supposed to include a storage battery and be powered by the electric energy stored in the storage battery.

In this embodiment, the mover 10 is implemented as a "burden carrier" for carrying the burden X1 as described above. Thus, the mover 10 travels on the traveling surface 200 with the body 1 loaded with the burden X1. This allows the mover 10 to carry the burden X1 placed at a certain location inside the facility to somewhere else inside the facility.

The body 1 is configured in the shape of a rectangular parallelepiped, of which the dimension measured in the forward/backward direction (i.e., its length) is greater than its dimension measured in the rightward/leftward direction (i.e., its width) and of which the dimension measured in the upward/downward direction (i.e., its height) is smaller than its length and its width. The body 1 includes a vehicle body 11 and a load-carrying deck 12. In this embodiment, the body 1 is made of a metallic material. However, this is only an example and should not be construed as limiting. Alternatively, the body 1 may also be made of a resin, for example.

The vehicle body 11 is supported on the traveling surface 200 by four wheels 13. The four wheels 13 are arranged at four corners of the vehicle body 11 in a plan view.

The load-carrying deck 12 is arranged over the vehicle body 11 so as to cover the upper surface of the vehicle body 11 at least partially. In this embodiment, the load-carrying deck 12 covers the upper surface of the vehicle body 11 almost entirely but a front edge and a rear edge of the vehicle body 11. The upper surface of the load-carrying deck 12 defines a load platform to be loaded with the burden X1. That is to say, when carried by the mover 10, the burden X1 is loaded onto the upper surface of the load-carrying deck 12.

The respective wheels 13 are configured to turn independently of each other under the driving force applied by the power transmission system drive unit 8 mounted on the vehicle body 11. These wheels 13 are held by the body 1 (more exactly, by the vehicle body 11) so as to turn around axles extending in the rightward/leftward direction.

In this embodiment, all of the four wheels 13 are drive wheels to be driven by the power transmission system drive unit 8. Driving all of these wheels 13 on an individual basis allows the body 1 to move in every direction. That is to say, the body 1 supported by the respective wheels 13 is allowed to move on the traveling surface 200 in all directions, including forward, backward, leftward, and rightward directions, by turning the respective wheels 13. Each of these wheels 13 may be an omnidirectional moving wheel such as an omni-wheel.

The power transmission system drive unit 8 applies driving force either directly or indirectly to a drive wheel that is at least one of the plurality of wheels 13. In this embodiment, the plurality of (four) wheels 13 are all drive wheels as described above, and therefore, the power transmission system drive unit 8 applies driving force to all of those wheels 13. The power transmission system drive unit 8 is built in the vehicle body 11. The power transmission system drive unit 8 includes an electric motor, for example, and applies the driving force generated by the electric motor to the wheels 13 indirectly via a gearbox, a belt, and other members. Alternatively, the power transmission system drive unit 8 may also be configured to apply the driving force directly to the respective wheels 13 as in an in-wheel motor. The power transmission system drive unit 8 drives, in response to a control signal from the control unit 2, the respective wheels 13 in rotational directions and rotational velocities specified by the control signal.

The control unit 2 controls the object detecting unit 3 and the power transmission system drive unit 8. In this embodiment, the control unit 2 is implemented as a computer system including, as its major components, a processor and a memory. In other words, a computer system, including a processor and a memory, functions as the control unit 2 by making the processor execute a program stored in the memory. The program may be stored in advance in the memory or may also be downloaded via a telecommunications line such as the Internet or distributed after having been stored on a non-transitory storage medium such as a memory card.

The object detecting unit 3 of this embodiment detects an object by driving the sensor units 4, having a transmitter unit 5 project a light wave as a scanning wave L1 (see FIG. 6), and having a receiver unit 6 receive the reflected wave (reflected light) reflected from the object.

The sensor units 4 may be each implemented as a light detection and ranging (LIDAR) sensor, for example, and detect the object in an object space surrounding the body 1.

The sensor units 4 each include the transmitter unit 5 and the receiver unit 6.

The transmitter unit 5 includes a light source such as a laser diode and a projection optical system. The scanning wave L1, such as a laser beam (in the form of pulses or continuous light) emitted from the light source, is radiated by a projection optical system toward an object space.

The receiver unit 6 includes a photodetector such as an array of photodiodes and a receiving optical system. When the light that has come from the object space is guided by the receiving optical system to be incident on the photodetector, the receiver unit 6 outputs the reception signal S21 or S22 representing the incident wave.

The sensor units 4 each include a scanning mechanism for scanning a plane parallel to the traveling surface 200 with the scanning wave L1. The scanning mechanism may rotate the projection optical system and the receiving optical system to the right and to the left within a plane parallel to the traveling surface 200, for example, thereby scanning the plane with the scanning wave L1 emitted from the transmitter unit 5 within a certain angular range. The transmitter unit 5 projects the scanning wave L1 toward the object space at regular intervals so as to scan the object space in regular cycles. This allows the scanning wave L1, transmitted from the transmitter unit 5, to be radiated toward the space surrounding the body 1. In other words, the transmitter unit 5 transmits the scanning wave (such as scanning light) within the plane parallel to the traveling surface 200. Stated otherwise, the transmitter unit 5 transmits the scanning wave (such as scanning light) so as to scan the plane parallel to the traveling surface 200. In this case, the range that the scanning wave L1 (e.g., a laser beam) projected from the transmitter unit 5 is able to reach becomes the object space in which the object is detectible.

The receiving optical system guides, within the angular range in which the scanning mechanism scans the plane with the scanning light, the light that has come from the object space to a photodetector such as an array of photodiodes such that reflected light of the scanning light is received at the photodetector. In this arrangement, if the object is present in the object space, the scanning light emitted from the transmitter unit 5 is reflected from the object, the reflected light is received at the photodetector, and the receiver unit 6 outputs the reception signal S21 or S22. That is to say, the transmitter unit 5 transmits the scanning wave as light (i.e., transmits the scanning light), and the receiver unit 6 receives incoming light including reflected light as a component, reflected from the object, of the scanning light. Also, if incoming light, not depending on the scanning light (scanning wave), is incident on the receiving optical system, the incident light is also guided by the receiving optical system to the photodetector. Thus, the incoming light that does not depend on the scanning light is also received at the photodetector.

In this embodiment, to detect the object within an angular range of 360 degrees centered around the body 1 within a plane parallel to the traveling surface 200, two sensor units 4 are respectively arranged at the front end and the rear end of the body 1. When the two sensor units 4 need to be distinguished from each other, the sensor unit 4 arranged at the front end of the body 1 will be hereinafter referred to as a "sensor unit 41" and the sensor unit 4 arranged at the rear end of the body 1 will be hereinafter referred to as a "sensor unit 42." The number and arrangement of the sensor units 4 may be changed as appropriate.

The object detecting unit 3 is implemented as a computer system including, as its major components, a processor and a memory. In other words, a computer system, including a processor and a memory, functions as the object detecting unit 3 by making the processor execute a program stored in the memory. The program may be stored in advance in the memory or may also be downloaded via a telecommunications line such as the Internet or distributed after having been stored on a non-transitory storage medium such as a memory card. In this embodiment, the control unit 2 and the object detecting unit 3 may be implemented as a single computer system. Also, the object detecting system 3 does not have to include a computer system as its major component, but may include an electrical circuit, made up of a plurality of circuit elements, as its major component as well.

The object detecting unit 3 outputs a transmission signal S11 to the transmitter unit 5 of the sensor unit 41 and also outputs a transmission signal S12 to the transmitter unit 5 of the sensor unit 42, thus making the respective transmitter units 5 of the sensor units 41 and 42 emit the scanning light. The scanning light emitted from the sensor units 4 is reflected from the object. When the reflected light is incident on the receiver units 6, the receiver units 6 output the reception signals S21 and S22 representing the incident light (reflected light) to the object detecting unit 3. The object detecting unit 3 is able to measure the distance to the object based on, for example, the time of flight that is an interval between a point in time when the scanning light is projected and a point in time when the reception signals S21 and S22 representing the reflected light (reflected wave) are input, thus detecting the presence of the object in the object space. In this specific example, the object detecting unit 3 according to this embodiment includes a masking processing unit 31. The masking processing unit 31 performs the masking processing of masking, in accordance with the timing at which the disturbance light (disturbance wave), not depending on the scanning light (scanning wave), is incident on the receiver units 6, respective portions of the reception signals S21 and S22 output from the receiver units 6. This allows the object detecting unit 3 to detect the object based on the reception signals S21 and S22, respective portions of which have been masked by the masking processing unit 31.

The location determining unit 7 determines the location of the body 1. The location determining unit 7 includes a receiver for receiving beacon signals transmitted, as radio waves, from a plurality of oscillators, for example. The plurality of oscillators are arranged at a plurality of sites within the range in which the mover 10 moves. The location determining unit 7 determines the location of the body 1 based on the locations of the plurality of oscillators and the intensities of the received radio waves of the beacon signals transmitted from the plurality of oscillators. Alternatively, the location determining unit 7 may also determine the location of the body 1 using a global positioning system (GPS), for example.

The power transmission system drive unit 8 controls the rotational velocity, rotational direction, and other parameters of the wheels 13 in accordance with a control signal supplied from the control unit 2, thereby controlling the velocity and direction of movement of the vehicle body 11.

Optionally, the mover 10 may further include other additional components such as a charging circuit for a storage battery as needed.

(1.3) Operation

Next, it will be described how the mover 10 according to this embodiment operates.

In a steady state, the mover 10 travels autonomously on the traveling surface 200 as its basic operation. The mover 10 makes the object detecting unit 3 detect the presence or absence of the object in/from the object space surrounding the body 1 and measure the distance to the object and other parameters and also makes the location determining unit 7 determine the location of the body 1. The control unit 2 of the mover 10 determines the route of movement based on information about the current location of the body 1, the destination, and the object in the surrounding object space and controls the power transmission system drive unit 8 to drive the wheels 13, thus allowing the mover 10 to travel autonomously.

While this mover 10 is traveling, the object detecting unit 3 makes the respective transmitter units 5 of the sensor units 4 (41, 42) transmit (or project) scanning light waves periodically (intermittently) to detect the presence or absence of the object and measure the distance to the object or any other parameter based on the reception signals S21 and S22 output from the receiver units 6.

Suppose two movers 10A and 10B are moving on the traveling surface 200 as shown in FIG. 2. In such a situation, the following description will be focused on the operation of the mover 10A, out of the two movers 10A and 10B moving around there. Specifically, in the mover 10A, the object detecting unit 3 makes the respective transmitter units 5 emit scanning light waves. Then, the object detecting unit 3 detects the presence or absence of the object and measures the distance to the object, or any other parameter, based on the reception signals S21 and S22 output from the receiver units 6. In this case, while the mover 10A and the other mover 10B are crossing each other as shown in FIG. 2, one of the receiver units 6 of one mover 10A may receive the scanning light wave coming from the other mover 10B, thus possibly letting the scanning light wave coming from the other mover 10B cause a detection error. Note that in FIG. 2, the scanning light wave coming from the other mover 10B is schematically indicated by the dotted curves.

In the mover 10A according to this embodiment, the masking processing unit 31 of the object detecting unit 3 decides, if any receiver unit 6 receives light (incident light) at a timing when its associated transmitter unit 5 is not projecting the scanning light, that disturbance light, such as the scanning light coming from the other mover 10B, should have been incident. If the disturbance light is the scanning light coming from the other mover 10B, then the sensor units 4 of the other mover 10B are also scanning the object space periodically. Thus, the masking processing unit 31 of the mover 10A is able to detect, based on the reception signals S21 and S22 output from the receiver units 6, the timing and cycle at which the disturbance light is incident.

Figure 4:
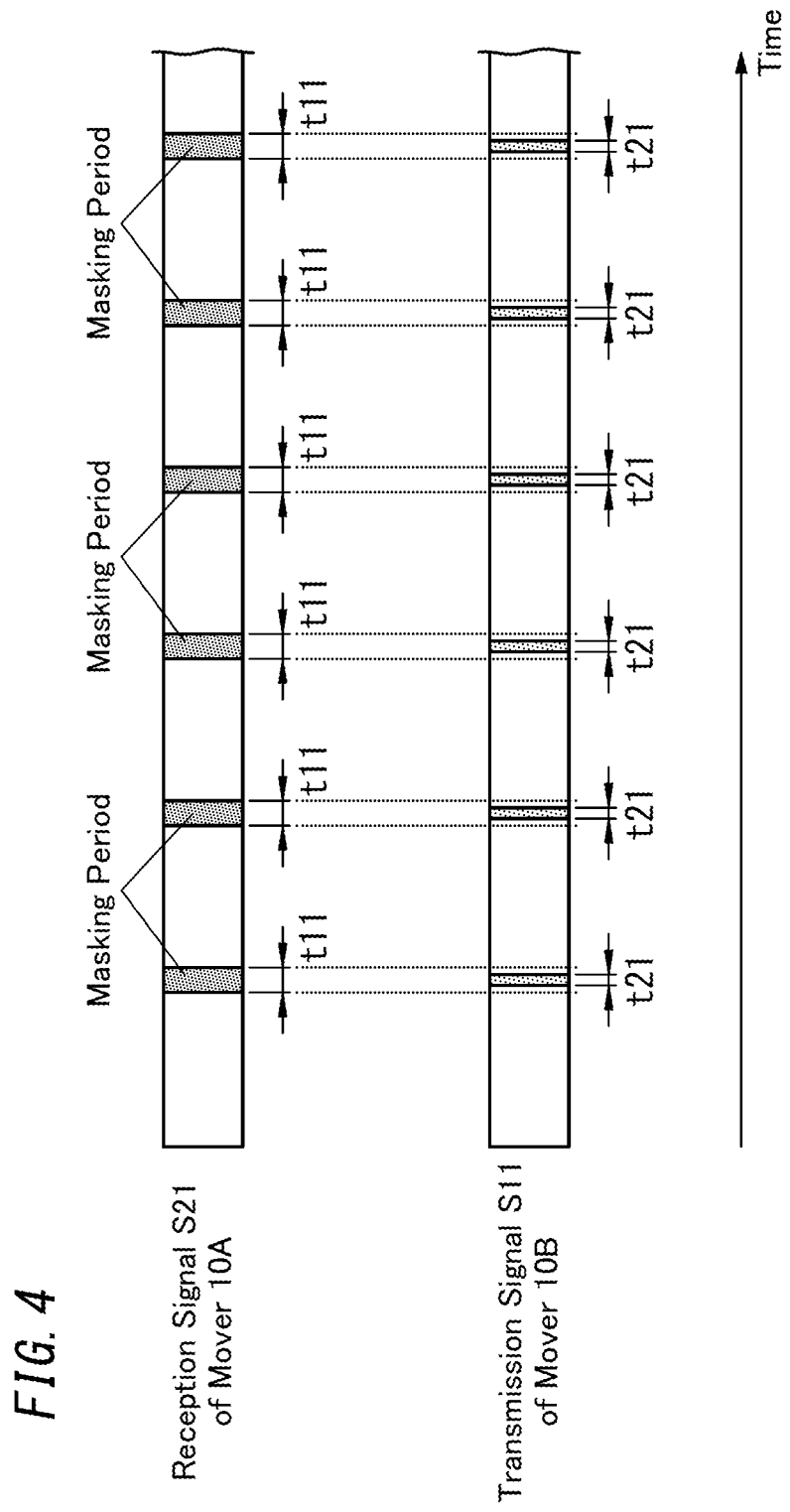
FIG. 4 is a timing diagram illustrating how in a situation where two movers according to the first embodiment are traveling in the same area, one of the two movers transmits a reception signal and the other mover transmits a transmission signal.

Reference is now made to FIG. 4, which is a timing diagram showing exemplary timings when the reception signal S21 is output from the receiver unit 6 of the mover 10A and when the transmission signal S11 is supplied to the transmitter unit 5 of the mover 10B. In the example illustrated in FIG. 4, the scanning light, emitted from the transmitter unit 5 of the mover 10B in response to the transmission signal S11 which is output during a period t21, is received at the receiver unit 6 of the mover 10A. In this case, the masking processing unit 31 sets each masking period t11 that includes a timing when the disturbance light is incident on the receiver unit 6 (i.e., the period t21). Then, the masking processing unit 31 performs masking processing of invalidating a portion of the reception signal S21 output from the receiver unit 6 (i.e., its signal portion during the masking period t11).

Next, the object detecting unit 3 detects the object based on the reception signals S21 and S22, respective portions of which (i.e., the signal portions during the masking period t11) have been invalidated by the masking processing unit 31. This reduces the chances of the object detecting unit 3 of the mover 10A receiving the scanning light (scanning wave) coming from the other mover 10B, and also reduces the chances of a detection error being caused by the scanning light (scanning wave) coming from the other mover 10B. For this purpose, when the receiver units 6 receives the disturbance light (disturbance wave), the masking processing unit 31 masks signal portions, corresponding to the disturbance light (disturbance wave), of the reception signals S21 and S22 output from the receiver unit 6. Thus, even when the mover 10A is moving, the masking processing unit 31 is still allowed to perform masking processing according to the disturbance light incident on the receiver units 6 at the current location of the mover 10A. That is to say, the masking processing unit 31 is able to perform the masking processing by detecting the disturbance light in the space surrounding the mover 10A.

Note that the disturbance light is not necessarily the scanning light coming from the other mover 10B but may also be natural light such as sunlight, illumination light, or scanning light coming from a reflective optical sensor installed in a range of movement of the mover 10. Furthermore, in the example illustrated in FIG. 4, the masking processing unit 31 masks a single portion of each of the reception signals S21 and S22 during one period in which the transmitter units 5 scan the object space. Alternatively, the masking processing unit 31 may also mask a plurality of portions of each of the reception signals S21 and S22 during one period in which the transmitter units 5 scan the object space. For example, in a situation where a plurality of disturbance light waves are incident on the receiver units 6, the plurality of disturbance light waves may be incident at mutually different timings on the receiver units 6 during one period in which the transmitter units 5 scan the object space. In that case, having a plurality of portions of each of the reception signals S21 and S22 masked by the masking processing unit 31 during one period in which the transmitter units 5 scan the object space also reduces the chances of causing detection errors, even when there are a plurality of disturbance light waves (or disturbance waves).

Figure 5:
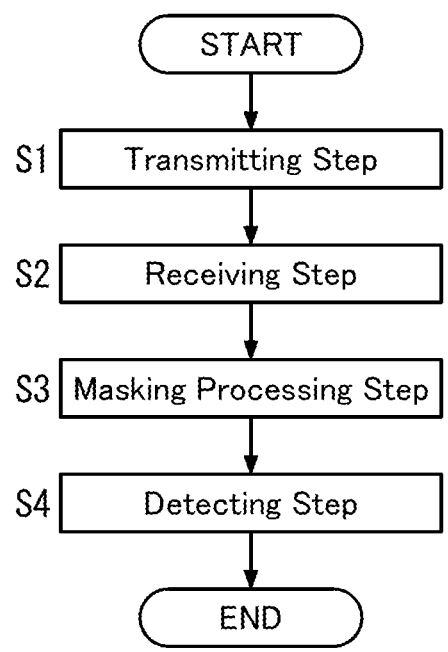
FIG. 5 is a flowchart illustrating how the mover operates.

Next, it will be described with reference to the flowchart of FIG. 5 how the mover 10 performs the operation of detecting the object. The object detecting unit 3 of the mover 10 performs, in Step S1, the processing step of having scanning light (scanning wave) transmitted from the transmitter units 5 toward the object space (hereinafter referred to as a "transmitting step"). The object detecting unit 3 also performs, in Step S2, the processing step of receiving the reception signal S21, S22 (hereinafter referred to as a "receiving step") that the receiver unit 6 outputs when receiving the incident light. Next, the masking processing unit 31 of the object detecting unit 3 performs, in Step S3, the processing step of masking a portion of the reception signal S21, S22 (hereinafter referred to as a "masking processing step") in accordance with a timing at which disturbance light, not depending on the scanning light coming from the mover 10A, is incident on the receiver unit 6. The disturbance light may be scanning light coming from the other mover 10B, for example. Then, the object detecting unit 3 performs, in Step S4, the processing step of detecting the object (hereinafter referred to as a "detecting step") based on the reception signal S21, S22 that has had a portion thereof masked by the masking processing unit 31. Note that in the mover 10B, the masking processing unit 31 also performs the masking processing in the same way as in the mover 10A, thus reducing the chances of a detection error being caused by the scanning light coming from the other mover 10A.

(1.4) Variations

The first embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the mover 10 according to the first embodiment may be implemented as a method of detecting an object by the mover 10, a (computer) program, or a non-transitory storage medium that stores the program thereon. A method of detecting an object by a mover 10 according to an aspect is a method of detecting an object by a mover 10 that moves around in an object space, surrounding the mover, to detect the object. The method includes a transmitting step, a receiving step, a masking processing step, and a detecting step. In the transmitting step, the transmitter unit 5 transmits scanning light (as a scanning wave). In the receiving step, the receiver unit 6 receives an incident wave and outputs a reception signal S21, S22. In the masking processing step, a portion of the reception signal S21, S22 output from the receiver unit 6 is masked in accordance with a timing at which, and/or a direction of incidence in which, a disturbance wave, not depending on the scanning light, is incident on the receiver unit 6. In the detecting step, the object is detected based on the reception signal S21, S22 that has had a portion thereof masked in the masking processing step.

A (computer) program according to another aspect is designed to make a computer system execute a transmitting step, a receiving step, a masking processing step, and a detecting step. In the transmitting step, the transmitter unit 5 is made to transmit scanning light. In the receiving step, a reception signal S21, S22 is received from the receiver unit 6 that outputs the reception signal S21, S22 representing an incident wave. In the masking processing step, a portion of the reception signal S21, S22 output from the receiver unit 6 is masked in accordance with a timing at which, and/or a direction of incidence in which, a disturbance wave, not depending on the scanning light, is incident on the receiver unit 6. In the detecting step, the object is detected based on the reception signal S21, S22 that has had a portion thereof masked in the masking processing step.

Next, variations of the first embodiment will be enumerated one after another. Optionally, any of the variations to be described below may be adopted in combination as appropriate.

In the mover 10 according to the present disclosure, the control unit 2, the object detecting unit 3, and other components may include a computer system. In that case, the computer system may include, as principal hardware components, a processor and a memory. The functions of the control unit 2, the object detecting unit 3 and other components according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (VLSI). Optionally, a field-programmable gate array (FPGA) to be programmed after an LSI has been fabricated or a logic device allowing the connections or circuit sections inside of an LSI to be reconstructed may also be adopted as the processor. Those electronic circuits may be either integrated together on a single chip or distributed on multiple chips without limitation. Those multiple chips may be integrated together in a single device or distributed in multiple devices without limitation.

(1.4.1) First Variation

In a mover 10 according to a first variation, the masking processing unit 31 performs masking processing in accordance with a direction of incidence in which disturbance light (disturbance wave) is incident on at least one receiver unit 6 (i.e., on only the receiver unit 6 of the sensor unit 41, only the receiver unit 6 of the sensor unit 42, or both of the respective receiver units 6 of the sensor units 41, 42), which is a major difference from the first embodiment. The mover 10 of this variation has the same configuration as its counterpart of the first embodiment, and therefore, description thereof will be omitted herein.

Figure 6:
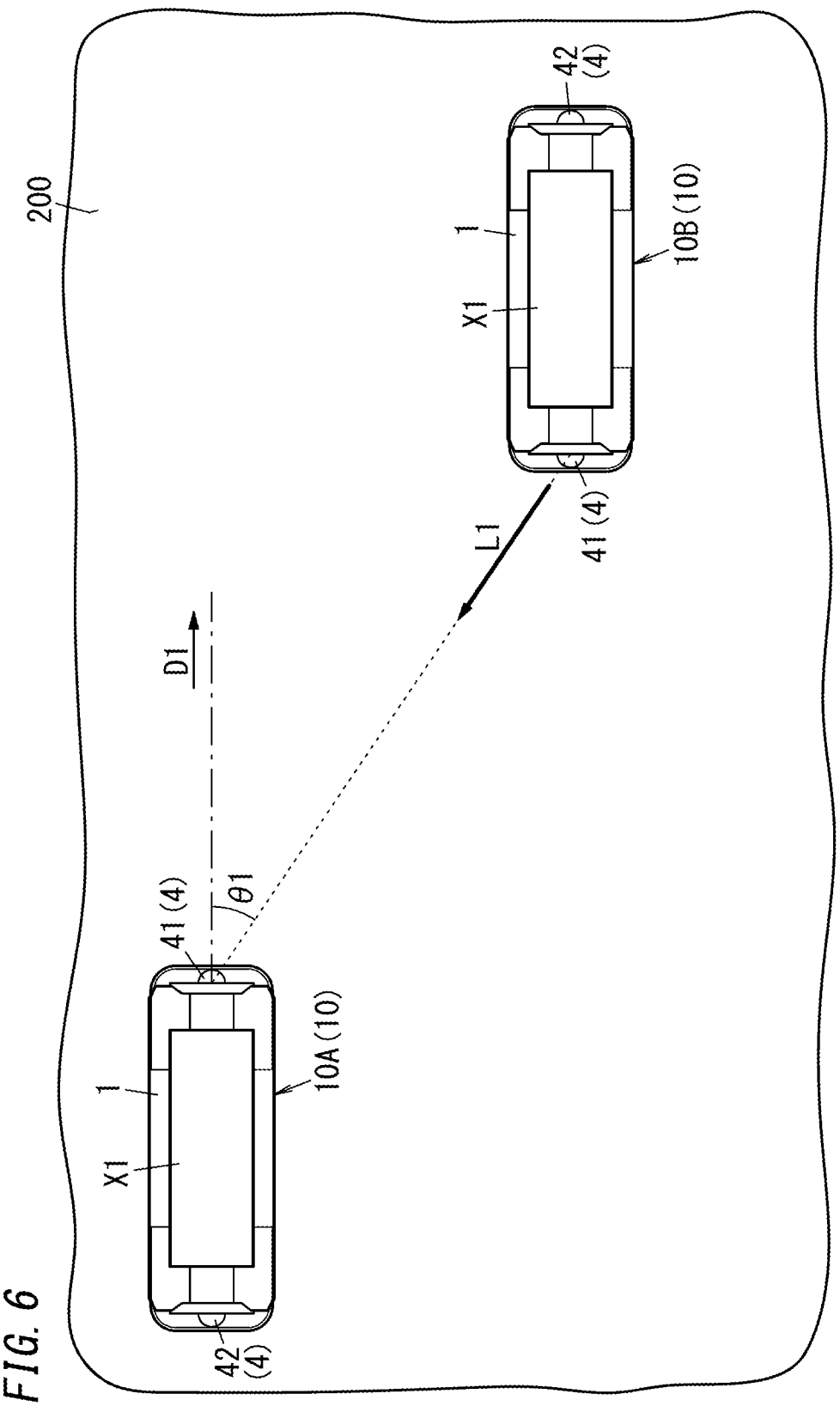
FIG. 6 illustrates an example of how a mover according to a first variation of the first embodiment may be used.

As shown in FIG. 6, while one mover 10A and another mover 10B are crossing each other, the receiver unit 6 of the former mover 10A may receive scanning light (as a scanning wave) coming from the latter mover 10B.

In the mover 10A, the object detecting unit 3 makes the at least one transmitter unit 5 (e.g., the transmitter unit 5 of the sensor unit 41 in the example illustrated in FIG. 6) emit the scanning light. The object detecting unit 3 detects the presence or absence of an object and measures the distance to the object based on the reception signal S21 supplied from the receiver unit 6 of the sensor unit 41 and/or the reception signal S22 supplied from the receiver unit 6 of the sensor unit 42. The receiver unit 6 includes a photodetector such as an array of photodiodes, and is able to detect a point of incidence of incoming light on the array of photodiodes through a receiving optical system. The object detecting unit 3 is also able to detect, based on the point of incidence of the incoming light on the array of photodiodes through the receiving optical system, a direction of incidence in which the incoming light is incident on the receiver unit 6.

Figure 7:
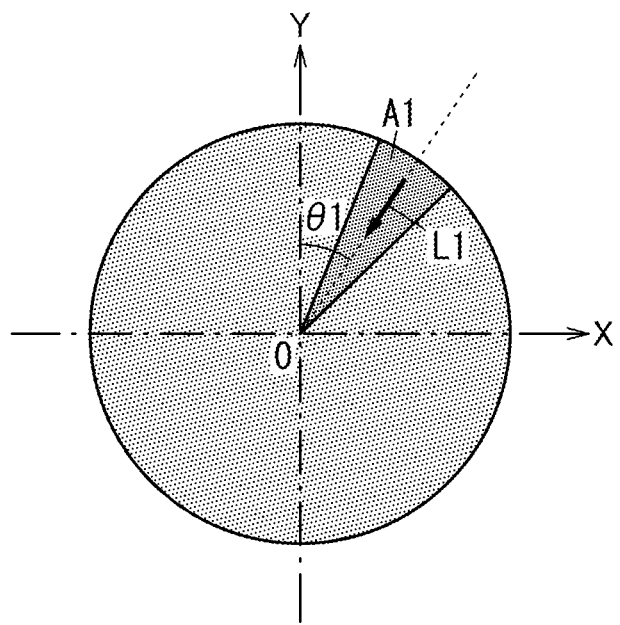
FIG. 7 illustrates how the mover performs masking processing.

In this variation, in a situation where the movers 10A and 10B are currently located at such positions as shown in FIG. 6, supposing the traveling direction (indicated by the arrow D1) of the mover 10A is a reference direction (with an angle of 0 degrees), the mover 10B is viewable for the mover 10A in a direction, defined by an angle $\theta 1$ with respect to the reference direction, within a plane parallel to the traveling surface 200. Thus, the scanning light coming from the mover 10B will be incident on the receiver unit 6 of the mover 10A from the direction defined by the angle $\theta 1$. FIG. 7 is a pie chart schematically illustrating, based on a plan view, the range in which the receiver unit 6 receives the incident light on the supposition that the origin of the pie chart indicates the location of the body 1 and the Y-axis indicates the traveling direction of the body 1. If the Y-axis direction defines a reference direction with an angle of 0 degrees, the scanning wave L1 coming from the mover 10B is incident from a direction that forms the angle $\theta 1$ with respect to the reference direction.

In the mover 10A according to the first variation, when the difference in angle between the transmitting direction in which the transmitter unit 5 transmits the scanning light and the direction of incidence in which the receiver unit 6 receives the incident light exceeds a threshold value (e.g., an angle of several to ten-odd degrees), the masking processing unit 31 decides that the disturbance light should have been incident there. The masking processing unit 31 defines an incident angle range A1, having a certain angular width around an angle defining the direction of incidence in which the disturbance light is incident, to be an angular range to be masked. In this case, a threshold value for use to determine whether or not the incident light is disturbance light and the angular width determining the incident angle range A1 to be masked may be changed appropriately depending on the intended use, the configuration of the sensor units 4, and other factors.

Then, the masking processing unit 31 masks, in accordance with the direction of incidence in which the disturbance light is incident on the receiver unit 6 (i.e., the direction defined by the angle $\theta 1$), a portion of the reception signal S21 output from the receiver unit 6. That is to say, the masking processing unit 31 masks a signal portion, corresponding to the incident angle range A1 determined in accordance with the direction of incidence of the disturbance light, of the reception signal S21 output from the receiver unit 6. In the example illustrated in FIG. 6, the mover 10B is moving toward the mover 10A from the front of the mover 10A in the traveling direction thereof, and the masking processing unit 31 masks a portion of the reception signal S21. However, this is only an example and should not be construed as limiting. The mover 10B may also be moving toward the mover 10A from behind the mover 10A in the traveling direction thereof (i.e., the mover 10B may be catching up with the mover 10A). In that case, the masking processing unit 31 masks a portion of the reception signal S22.

This allows the object detecting unit 3 to detect the object based on the reception signal S21 or S22, a portion of which (i.e., the signal portion corresponding to the incident angle range A1) has been invalidated by the masking processing unit 31. This reduces the chances of the object detecting unit 3 of the mover 10A receiving the scanning light coming from the other mover 10B to cause a detection error. Note that the disturbance light is not necessarily the scanning light coming from the other mover 10B but may also be natural light such as sunlight, illumination light, or scanning light coming from a reflective optical sensor installed in a range of movement of the mover 10. Optionally, according to the first variation, in a situation where disturbance light waves are incident on the receiver unit 6 from a plurality of directions of incidence, the masking processing unit 31 may mask a plurality of portions, respectively corresponding to the directions of incidence of those disturbance light waves, within a single period in which the transmitter unit 5 scans the object space. Examples of situations where a plurality of disturbance light waves are incident on the receiver unit 6 include a situation where the receiver unit 6 of the mover 10A receives a plurality of scanning waves respectively transmitted from a plurality of movers and a situation where the receiver unit 6 of the mover 10A receives a plurality of scanning waves respectively transmitted from a plurality of transmitter units of a single mover.

(1.4.2) Second Variation

Figure 8:
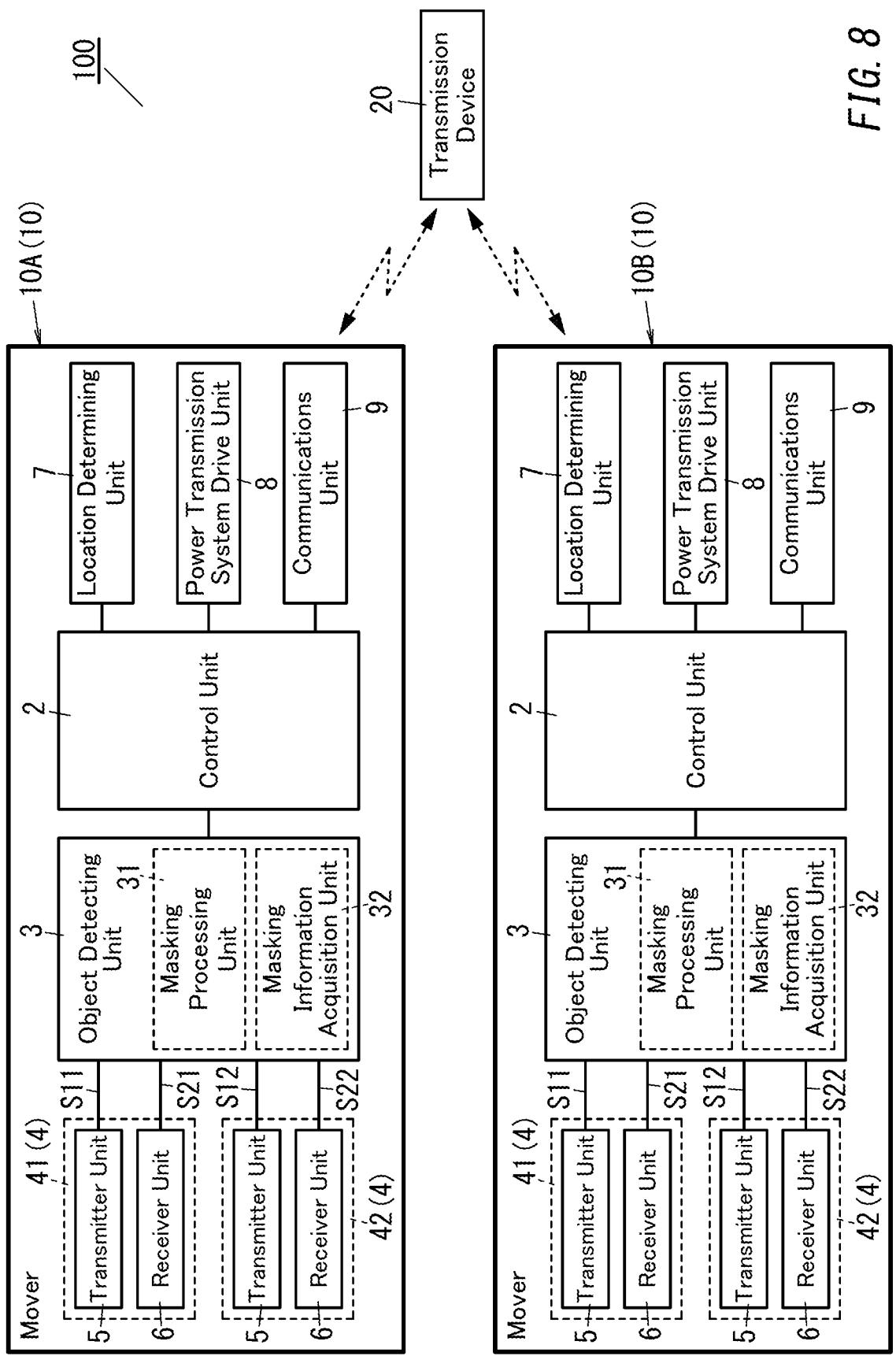
FIG. 8 is a block diagram of a mover control system including a mover according to a second variation of the first embodiment.

A mover 10 (10A, 10B) according to this second variation further includes, as shown in FIG. 8, a communications unit 9 for communicating with a transmission device 20, and a masking information acquisition unit 32 for acquiring masking information transmitted from the transmission device 20, which is a major difference from the first embodiment and the first variation described above. In the following description, any constituent member of this second variation having the same function as a counterpart of the first embodiment or first variation described above will be designated by the same reference numeral as that counterpart's, and a detailed description thereof will be omitted herein.

The communications unit 9 may include, for example, a communications module designed to establish wireless communication by a communication method that requires no wireless station license. Examples of this type of communication methods include ones compliant with Bluetooth®, ZigBee®, and Specified Low Power Radio standards. The communications unit 9 has a communication capability to communicate with the transmission device 20, which is a high-order system.

In the mover 10 (10A, 10B) according to the second variation, the object detecting unit 3 performs the function of the masking information acquisition unit 32. The masking information acquisition unit 32 acquires masking information about disturbance light. In this embodiment, the communications unit 9 receives the masking information transmitted from the transmission device 20. The masking information includes, for example, information about the scanning light emitted from another mover 10 present in the object space. In this embodiment, the masking information includes location information about the location of the other mover 10 that is the source of the scanning light. The masking information acquisition unit 32 acquires, via the control unit 2, the masking information received by the communications unit 9. Note that the control unit 2 and the object detecting unit 3 are implemented as a single computer system, and therefore, the object detecting unit 3 may acquire the masking information directly from the communications unit 9.

The masking processing unit 31 performs the masking processing of masking, in accordance with the masking information acquired by the masking information acquisition unit 32, a portion of the reception signal S21, S22 output from the receiver unit 6. The masking information is information about scanning light emitted from another mover 10 other than the mover 10A. This allows the masking processing unit 31 to perform the masking processing in accordance with the masking information that the masking information acquisition unit 32 has acquired from outside of the mover 10A. In addition, this also allows the masking processing unit 31 to perform the masking processing in accordance with information about the scanning light emitted from the other mover 10.

In this variation, the masking information includes, as pieces of information about the scanning light emitted from the mover 10 other than the mover 10A, a timing and a period at/in which the mover 10, other than the mover 10A, emits the scanning light. The masking processing unit 31 acquires, in accordance with the masking information that the masking information acquisition unit 32 has acquired, information about the timing and period at/in which the other mover 10 emits the scanning light. Thus, the masking processing unit 31 determines, in accordance with the masking information that is information about the scanning light emitted from the other mover 10, the timing to mask a portion of the reception signals S21, S22, and performs the masking processing in accordance with the timing thus determined. This reduces the chances of the object detecting unit 3 of the mover 10A receiving the scanning light from the other mover 10B to cause detection errors in the end.

Optionally, the transmission device 20 may transmit the masking information, including location information about the location of the other mover 10, to the mover 10. In that case, the masking processing unit 31 of the mover 10 determines, in accordance with the location information (masking information) about the location of the other mover 10, the direction of incidence in which the scanning light coming from the other mover 10 (i.e., the disturbance light) is incident on the receiver unit 6, and performs the masking processing in accordance with the direction of incidence thus determined. This allows the masking processing unit 31 of the mover 10A to determine, in accordance with information about the scanning light emitted from the other mover 10B (i.e., masking information including the location information), the direction of incidence in which the disturbance light is incident, and perform the masking processing in accordance with the direction of incidence.

Note that in the mover 10B, the masking processing unit 31 also performs masking processing in accordance with the masking information received from the transmission device 20, thus reducing the chances of the scanning light coming from the mover 10A causing detection errors.

As can be seen from the foregoing description, a mover control system 100 includes a plurality of movers 10 and a transmission device 20. The transmission device 20 transmits masking information, including location information about locations of the plurality of movers 10, to each of the plurality of movers 10. The masking processing unit 31 of each of the plurality of the movers 10 masks, in accordance with the location information, a portion of the reception signals S21, S22 output from the receiver unit 6 thereof. This allows the masking information acquisition unit 32 of each of the plurality of movers 10 to perform masking processing in accordance with the masking information acquired from the transmission device 20.

In the second variation described above, the plurality of movers 10 (10A, 10B) receive the masking information from the transmission device 20. Alternatively, each of the plurality of movers 10 may receive the masking information directly from another one of the plurality of movers 10.

Furthermore, in the embodiments described above, the function of the object detecting unit 3 is performed by the mover 10. However, this is only an example and should not be construed as limiting. Alternatively, the function of the object detecting unit 3 may also be performed by the transmission device 20. Optionally, some functions of the mover 10, such as the function of the object detecting unit 3, may be performed by cloud computing as well.

(1.4.3) Other Variations

In the first embodiment and first and second variations described above, the transmitter unit 5 radiates a scanning wave as light (light wave), and a reflected wave (reflected light) reflected from an object is received, thus detecting the object. However, this is only an example and should not be construed as limiting. The scanning wave does not have to be light (light wave). The transmitter unit 5 may include a radar that transmits a radio wave such as a microwave or a millimeter wave. Alternatively, the transmitter unit 5 may include a sonar sensor that transmits an acoustic wave such as an ultrasonic wave.

In the first embodiment described above, the mover 10 is used to carry a burden X1. However, the mover 10 is not necessarily used to carry the burden X1. Alternatively, the mover 10 may also be a vehicle for carrying humans (i.e., may also be a passenger vehicle). Still alternatively, the mover 10 may also be a device that moves without carrying anything such as a surveillance robot or a guide robot.

Furthermore, the control unit 2, the object detecting unit 3, and other components provided for the body 1 in the first embodiment may be provided for any component other than the body 1. For example, some functions of the control unit 2 and the object detecting unit 3 may be performed by the transmission device 20, which is a high-order system with the ability to communicate with the body 1.

Optionally, the mover 10 may have the capability of communicating with the transmission device 20 as a high-order system. Furthermore, the mover 10 does not have to be designed to travel autonomously. Alternatively, the mover 10 may also be remote-controlled by receiving an operating signal from a high-order system such as the transmission device 20 or a transmitter, for example.

Second Embodiment (2.1) Overview

Next, a mover 10 and moving system 100A according to a second embodiment will be described. In the following description, any constituent member of the second embodiment having the same function as a counterpart of the mover 10 according to the first embodiment and its variations described above will be designated by the same reference numeral as that counterpart's, and a detailed description thereof will be omitted herein.

A mover 10 (10A, 10B) according to this embodiment includes a body 1 configured to move around, an object detecting unit 3 (see FIG. 10) provided for the body 1, and a transmission restricting unit 33. The object detecting unit 3 detects an object by having a transmitter unit 5 transmit a scanning wave and by having a receiver unit 6 receive a reflected wave. The reflected wave is a component, reflected from the object, of the scanning wave. The transmission restricting unit 33 restricts a transmission range 50 (see FIG. 9) in which the transmitter unit 5 transmits the scanning wave. Note that in the following description, when it is necessary to distinguish the transmission range of the mover 10A from that of the mover 10B, the transmission ranges of the movers 10A and 10B will be designated by the reference numerals 50A and 50B, respectively.

As used herein, the "scanning wave" refers to at least one of light (light waves), radio waves, or acoustic waves, and is transmitted from the transmitter unit 5 toward the space surrounding the body 1. The reflected wave is produced by having the scanning wave strike, and be reflected from, an object that is present in the space surrounding the mover 10. Examples of the objects include another mover 10 traveling on the same traveling surface 200 as the mover's 10, and a still object placed on the traveling surface 200. The transmission range 50 of a mover 10 may be, for example, an area in which there are no movers 10 other than the mover 10 itself (particularly, the receiver unit 6 of the mover 10), and may be changed appropriately according to the current location of the mover 10 or any other factor. Note that in FIG. 9 and FIGS. 13-15, the line segments and hatching indicating the transmission ranges 50 (50A, 50B) are illustrated there for illustrative purposes only and are insubstantial ones.

The mover 10 according to this embodiment allows the scanning wave transmission range 50 to be restricted by the transmission restricting unit 33. This reduces the chances of, even when another mover 10 is present outside of the transmission range 50 of one mover 10, the scanning wave transmitted from the transmitter unit 5 of the one mover 10 being received by the receiver unit 6 of the other mover 10. This reduces the chances of the other mover 10 causing detection errors.

(2.2) Configuration

Next, configurations for the mover 10 and moving system 100A according to this embodiment will be described in detail with reference to FIG. 1 and FIGS. 9-11.

The moving system 100A is made up of a plurality of movers 10 and a high-order system 300 with the ability to communicate with those movers 10.

Each of the movers 10 includes the body 1, the object detecting unit 3, and the transmission restricting unit 33 as described above. In this embodiment, each mover 10 further includes a control unit 2, sensor units 4 (41, 42), a location determining unit 7, a power transmission system drive unit 8, and a communications unit 9. According to this embodiment, the control unit 2, the object detecting unit 3, the sensor units 4 (41, 42), the location determining unit 7, the power transmission system drive unit 8, and the communications unit 9 are all built in the body 1. The communications unit 9 has communication capability to communicate with the high-order system 300. Note that the control unit 2, the sensor units 4 (41, 42), the location determining unit 7, the power transmission system drive unit 8, the communications unit 9, and the body 1 each have the same configuration as its counterpart of the first embodiment or a variation thereof. Thus, in the following description, each of these constituent members will be designated by the same reference numeral as its counterpart's, and a detailed description thereof will be omitted herein.

In this embodiment, to detect the object within an angular range of 360 degrees centered around the body 1 within a plane parallel to the traveling surface 200, two sensor units 4 are respectively arranged at the front end and at the rear end of the body 1. When the two sensor units 4 need to be distinguished from each other, the sensor unit 4 arranged at the front end of the body 1 will be hereinafter referred to as a "sensor unit 41" and the sensor unit 4 arranged at the rear end of the body 1 will be hereinafter referred to as a "sensor unit 42." The number and arrangement of the sensor units 4 may be changed as appropriate. Note that in FIG. 9 and FIGS. 13-15, the transmission range 50 (50A, 50B) is illustrated for only the sensor unit 41 arranged at the front end of the mover 10 but not illustrated for the sensor unit 42 arranged at the rear end of the mover 10 for the sake of simplicity.

The object detecting unit 3 according to this embodiment also performs the functions of the transmission restricting unit 33 described above and an acquisition unit 34.

The acquisition unit 34 acquires restriction information about a restricted range, in which the scanning wave is not to be transmitted, from an external device (such as the high-order system 300). As used herein, the "restricted range" refers to a range covering a location where another mover 10, other than the mover 10 itself, is currently present. The high-order system 300 communicates with the plurality of movers 10 to collect, from each of those movers 10, location information about the current location of the mover 10. The high-order system 300 creates restriction information, including information about the current locations of those movers 10, and transmits the restriction information thus created to the plurality of movers 10.

In each of the plurality of movers 10, the communications unit 9 receives the restriction information transmitted from the high-order system 300. The acquisition unit 34 acquires, via the control unit 2, the restriction information received by the communications unit 9. Note that since the control unit 2 and the object detecting unit 3 are implemented as a single computer system, the object detecting unit 3 may acquire the restriction information directly from the communications unit 9.

The transmission restricting unit 33 restricts, when the object detecting unit 3 detects the presence of another mover 10 other than its own mover 10, for example, the transmission range 50 in which the transmitter unit 5 transmits the scanning wave. The transmission restricting unit 33 of each of the movers 10A, 10B restricts, in accordance with the restriction information acquired by the acquisition unit 34, the transmission range 50A, 50B in which the transmitter unit 5 transmits the scanning wave. For example, the transmission restricting unit 33 of one mover 10 determines, based on information, included in the restriction information, about the current location of another mover 10, the restricted range 51 in which the scanning wave is not to be transmitted. Then, the transmission restricting unit 33 determines the transmission range 50 in which the scanning wave is transmitted such that the restricted range 51 is not included in the transmission range 50. This reduces the chances of the scanning wave output from one mover 10 being received by the receiver unit 6 of another mover 10.

The object detecting unit 3 makes the transmitter unit 5 transmit the scanning wave to the transmission range 50 set by the transmission restricting unit 33. The scanning wave emitted from the sensor unit 4 is reflected from the object. When the reflected wave is incident on the receiver unit 6, the receiver unit 6 outputs the reception signal S21, S22 representing the reflected wave to the object detecting unit 3. The object detecting unit 3 is able to measure the distance to the object based on, for example, the time of flight that is an interval between a point in time when the scanning wave is transmitted and a point in time when the reception signal S21, S22 representing the reflected wave is input, thus detecting the presence of the object in the transmission range 50.

The high-order system 300 has communication capability to communicate with the plurality of movers 10 moving on the traveling surface 200. The high-order system 300 receives, from each of those movers 10 moving on the traveling surface 200, location information about the current location of the mover 10. The high-order system 300 creates restriction information, including information about the current locations of the plurality of movers 10, and transmits the restriction information thus created to the plurality of movers 10.

(2.3) Operation

Next, it will be described how the movers 10 and high-order system 300 according to this embodiment operate.

Figure 9:
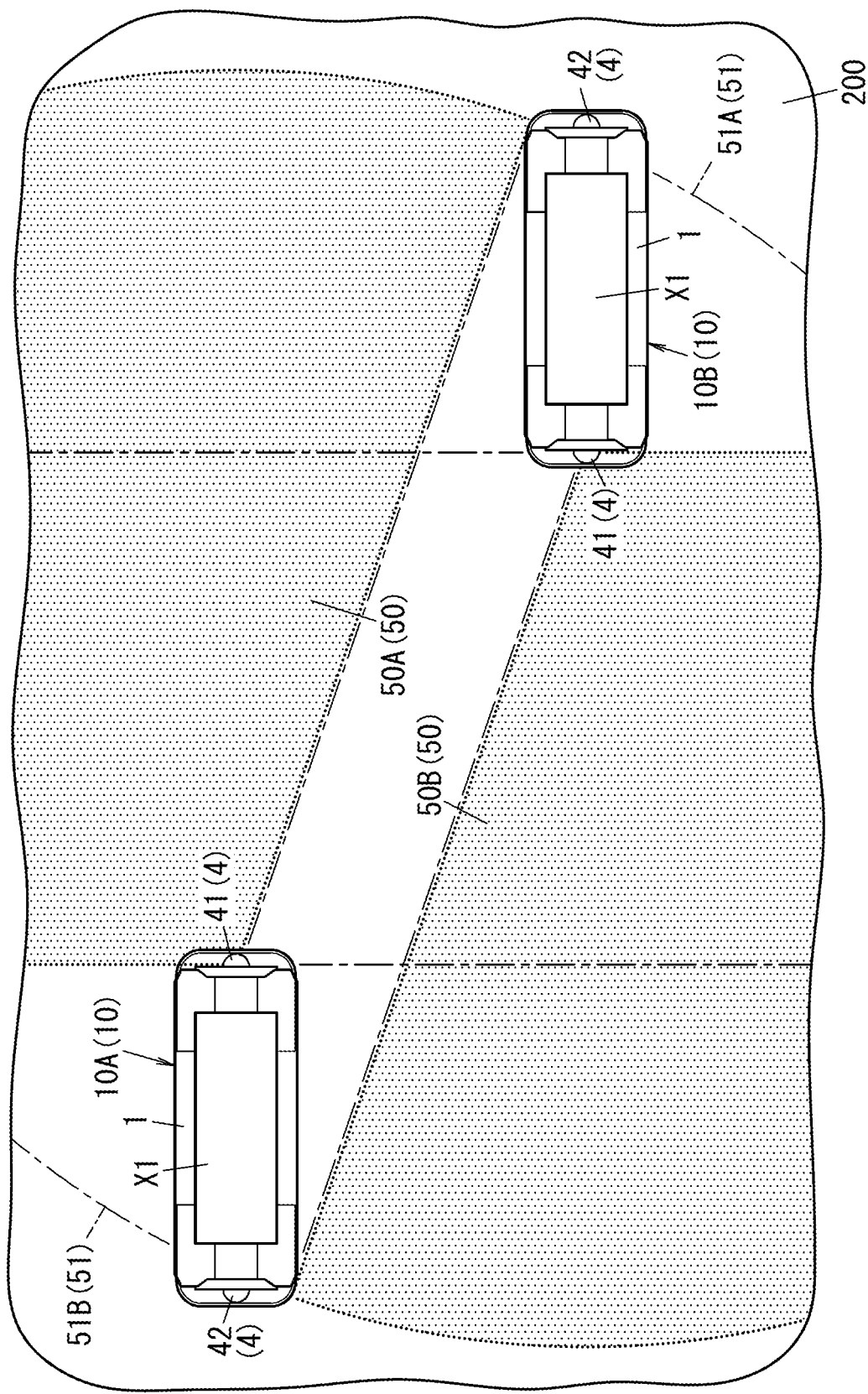
FIG. 9 illustrates an example of how a mover according to a second embodiment of the present disclosure may be used.
Figure 10:
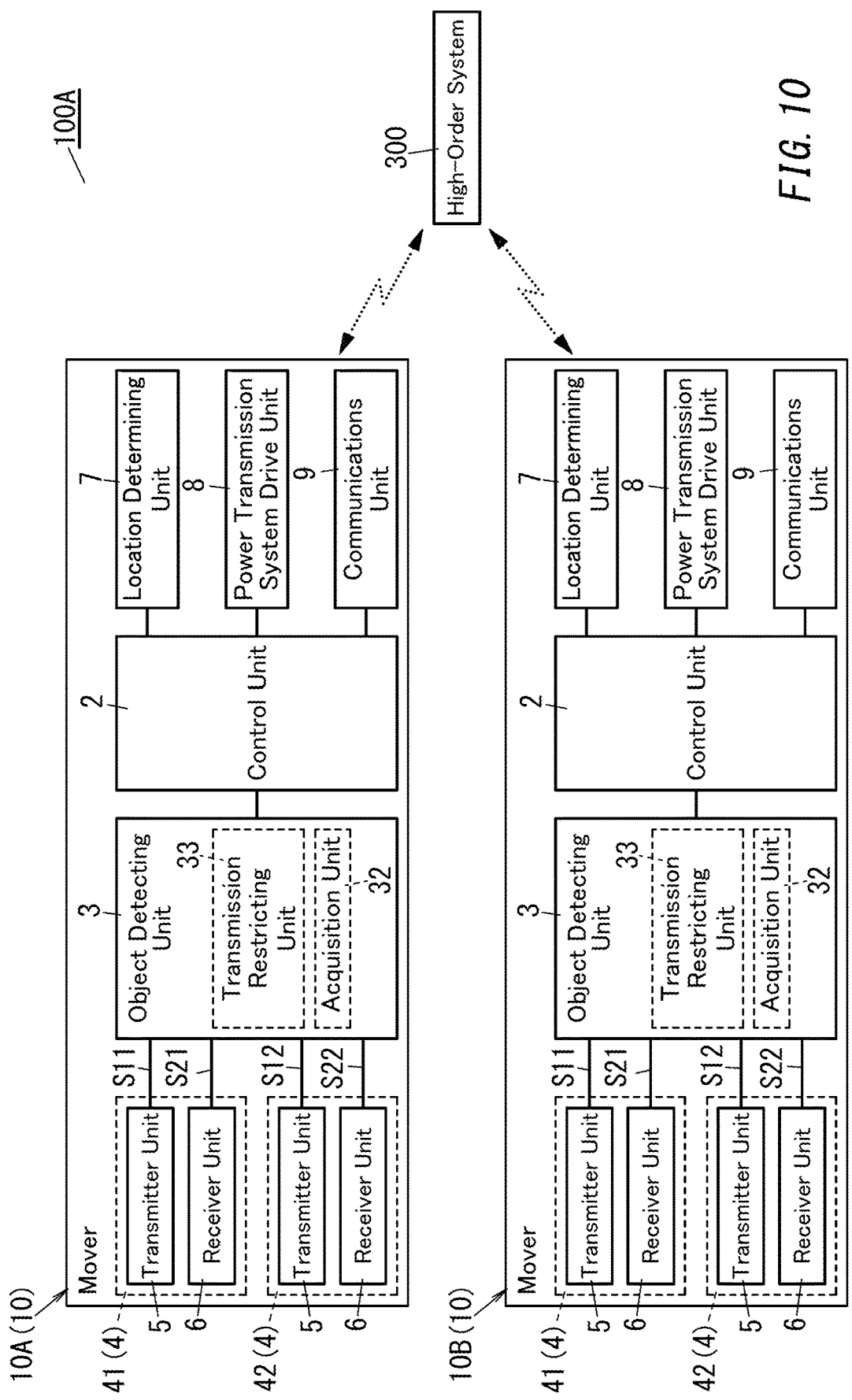
FIG. 10 is a block diagram of a moving system according to the second embodiment.
Figure 11:
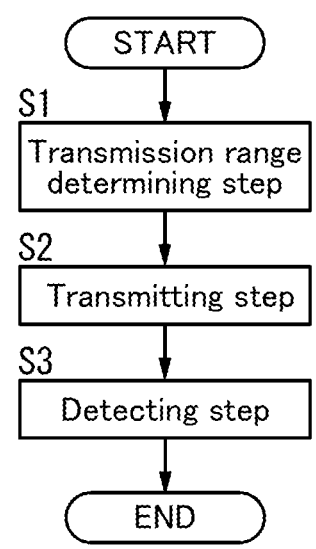
FIG. 11 is a flowchart illustrating how the mover operates.

The following description will be focused, in a situation where two movers 10A and 10B are moving on the traveling surface 200 as shown in FIG. 9, on the operation of the mover 10A. In the following description, the operation of the mover 10A will be described with reference to the flowchart of FIG. 11.

In the mover 10A, the control unit 2 has the location information, representing the current location detected at regular intervals by the location determining unit 7, transmitted from the communications unit 9 to the high-order system 300. On receiving the location information from the plurality of movers 10 (10A, 10B) moving on the traveling surface 200, the high-order system 300 creates restriction information including pieces of information about the respective current locations of the plurality of movers 10 (10A, 10B). The high-order system 300 then transmits the restriction information thus created to the plurality of movers 10.

When the communications unit 9 of the mover 10A receives the restriction information transmitted from the high-order system 300, the acquisition unit 34 acquires the restriction information via the control unit 2. Once the acquisition unit 34 has acquired the restriction information, the transmission restricting unit 33 performs the processing step of determining, in accordance with the restriction information, the restricted range 51A in which the scanning wave is not to be transmitted and determining the transmission range 50A in which the transmitter unit 5 transmits the scanning wave so as to restrict the transmission range 50A (hereinafter referred to as a "transmission range determining step") (in Step S1). As used herein, "to restrict the transmission range 50A" refers to narrowing a range where the transmitter unit 5 transmits the scanning wave from a transmissible range.

When the transmission range 50A is determined by the transmission restricting unit 33, the object detecting unit 3 performs the processing step of transmitting the scanning wave (scanning light) from the transmitter unit 5 to the transmission range 50A (hereinafter referred to as a "transmitting step") (in Step S2). The scanning wave transmitted from the transmitter unit 5 impinges, and is reflected from, the object and the reflected wave is received by the receiver unit 6. Then, the receiver unit 6 outputs the reception signal S21. The object detecting unit 3 performs the processing step of detecting the object (hereinafter referred to as a "detecting step") by making the receiver unit 6 receive the reflected wave, which is a component, reflected from the object, of the scanning wave (in Step S3).

For example, the transmission restricting unit 33 of the mover 10A determines, in accordance with the information, included in the restriction information, about the current location of the mover 10B other than its own mover 10A, relative locations of the movers 10A and 10B, and sets a range covering the current location of the mover 10B as the restricted range 51A in which the scanning wave is not to be transmitted. In this case, the transmission restricting unit 33 may determine the restricted range 51A such that the entire mover 10B falls within the restricted range 51A or that at least the location where the receiver unit 6 is arranged in the mover 10B falls within the restricted range 51A. Having determined the restricted range 51A in this manner, the transmission restricting unit 33 determines the transmission range 50A such that the restricted range 51A is not included in the transmission range 50A. This reduces the chances of the scanning wave, output from the mover 10A, being received by the receiver unit 6 of the mover 10B, thus eventually reducing the chances of the mover 10B causing detection errors.

Likewise, the transmission restricting unit 33 of the mover 10B also determines, in accordance with the restriction information acquired by the acquisition unit 34, a restricted range 51B in which the scanning wave is not to be transmitted, and sets a transmission range 50B in which the transmitter unit 5 transmits the scanning wave such that the restricted range 51B is not included in the transmission range 50B. That is to say, in the mover 10B, the transmission range 50B in which the scanning wave is transmitted from the transmitter unit 5 is also restricted in the same way as in the mover 10A. This reduces the chances of the scanning wave, output from the mover 10B, being received by the receiver unit 6 of the mover 10A, thus eventually reducing the chances of the mover 10A causing detection errors.

The object detecting unit 3 has the scanning wave transmitted from the transmitter unit 5 to the transmission range 50 (50A, 50B) determined by the transmission restricting unit 33. The object detecting unit 3 outputs a transmission signal S11 to the transmitter unit 5 of the sensor unit 41 and also outputs a transmission signal S12 to the transmitter unit 5 of the sensor unit 42, thus making the respective transmitter units 5 of the sensor units 41 and 42 emit the scanning light. The scanning light emitted from the sensor units 4 is reflected from the object. When the reflected light is incident on the receiver units 6, the receiver units 6 output the reception signals S21 and S22 representing the incident light (reflected light) to the object detecting unit 3. The object detecting unit 3 is able to measure the distance to the object based on, for example, the time of flight that is an interval between a point in time when the scanning light is projected and a point in time when the reception signals S21 and S22 representing the reflected light (reflected wave) are input, thus detecting the presence of the object in the object space.

This allows the mover 10 to travel autonomously on the traveling surface 200 while avoiding colliding against the object.

(2.4) Variations

The second embodiment described above is only one of various embodiments of the present disclosure, and may be readily modified, changed, replaced, or combined with any other embodiments, depending on a design choice or any other factor, without departing from a true spirit and scope of the present disclosure. Also, the same function as that of the mover 10 according to the second embodiment may be implemented as a method of controlling the mover 10, a (computer) program, or a non-transitory storage medium that stores the program thereon. A method of controlling a mover 10 according to an aspect includes a transmission range determining step, a transmitting step, and a detecting step. In the transmission range determining step, a transmission range 50, in which a transmitter unit 5 transmits a scanning wave, is determined so as to be a restricted one. In the transmitting step, the transmitter unit 5 transmits the scanning wave to the transmission range 50. In the detecting step, the object is detected by making the receiver unit 6 receive a reflected wave, which is a component, reflected from the object, of the scanning wave.

A (computer) program according to another aspect is designed to make a computer system execute a transmission range determining step, a transmitting step, and a detecting step. In the transmission range determining step, a transmission range 50, in which a transmitter unit 5 transmits a scanning wave, is determined so as to be a restricted one. In the transmitting step, the transmitter unit 5 transmits the scanning wave to the transmission range 50. In the detecting step, the object is detected by making the receiver unit 6 receive a reflected wave, which is a component, reflected from the object, of the scanning wave.

Next, variations of the second embodiment will be enumerated one after another. Optionally, any of the variations to be described below may be adopted in combination as appropriate.

In the mover 10 according to the present disclosure, the control unit 2, the object detecting unit 3, and other components may include a computer system. In that case, the computer system may include, as principal hardware components, a processor and a memory. The functions of the control unit 2, the object detecting unit 3 and other components according to the present disclosure may be performed by making the processor execute the program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a largescale integrated circuit (LSI). As used herein, the "integrated circuit" such as an IC or an LSI is called by a different name depending on the degree of integration thereof. Examples of the integrated circuits include a system LSI, a very largescale integrated circuit (VLSI), and an ultra largescale integrated circuit (VLSI). Optionally, a field-programmable gate array (FPGA) to be programmed after an LSI has been fabricated or a logic device allowing the connections or circuit sections inside of an LSI to be reconstructed may also be adopted as the processor. Those electronic circuits may be either integrated together on a single chip or distributed on multiple chips without limitation. Those multiple chips may be integrated together in a single device or distributed in multiple devices without limitation.

(2.4.1) Third Variation

Figure 12:
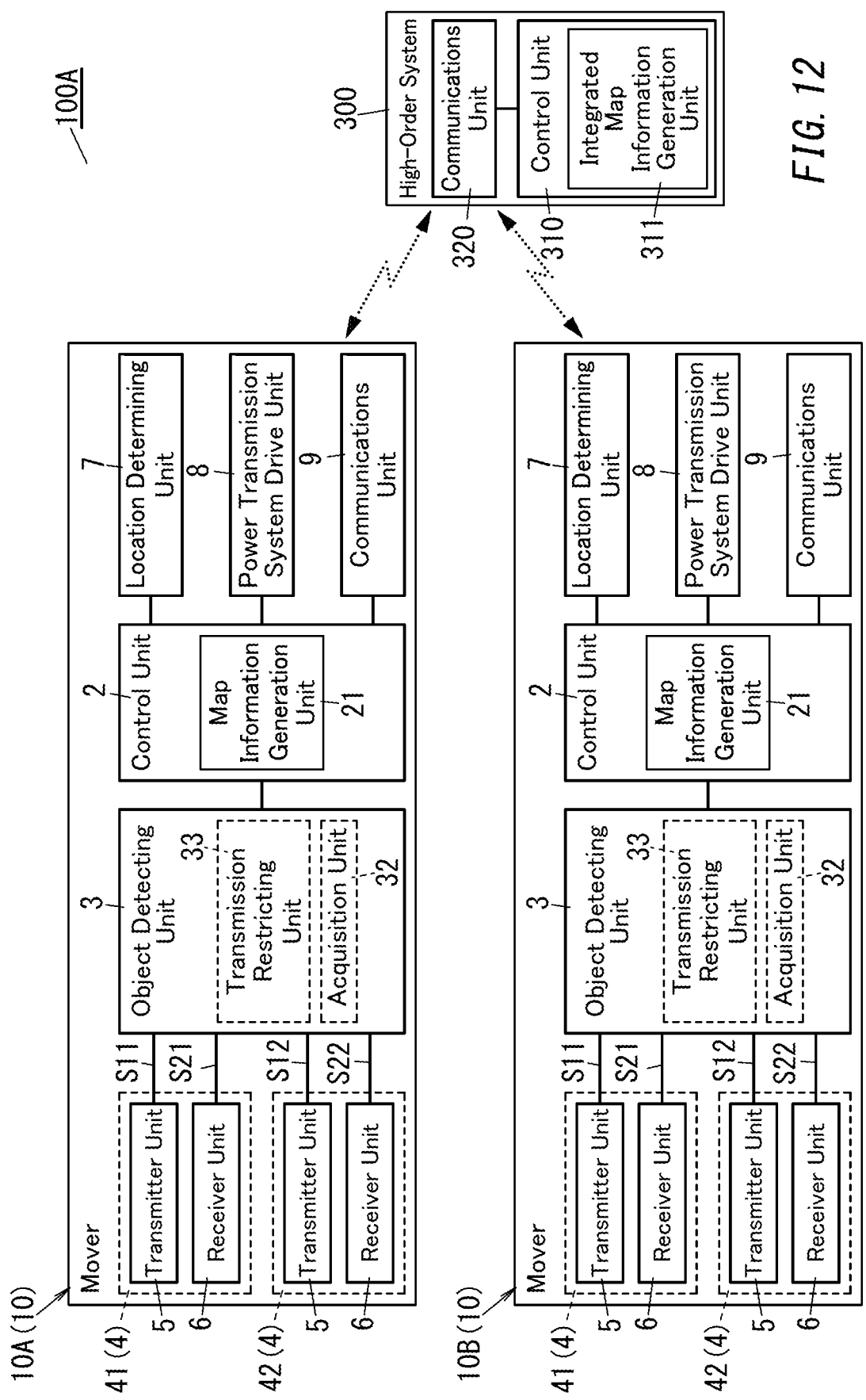
FIG. 12 is a block diagram of a moving system according to a third variation of the second embodiment.

In a moving system 100A according to a third variation, the mover 10 includes a map information generation unit 21, and the high-order system 300 includes an integrated map information generation unit 311 as shown in FIG. 12, which is a difference from the second embodiment described above. In the following description, any constituent member of this variation having the same function as a counterpart of the second embodiment described above will be designated by the same reference numeral as that counterpart's, and a detailed description thereof will be omitted herein.

The control unit 2 of the mover 10 performs the function of the map information generation unit 21. The map information generation unit 21 generates, based on a result of detection by the object detecting unit 3, map information for the transmission range 50. The control unit 2 makes the communications unit 9, serving as a map information transmission unit, transmit the map information generated by the map information generation unit 21 to an external device (such as the high-order system 300). As used herein, the "map information" refers to a piece of information representing, in a coordinate system (e.g., a two-dimensional coordinate system or a three-dimensional coordinate system) of a space in which the mover 10 moves, the location (coordinates) of an object (such as another mover 10 or a still object) present in the space.

The high-order system 300 includes a control unit 310 and a communications unit 320.

The communications unit 320 includes a communications module for communicating wirelessly with the communications unit 9 of the mover 10.

The control unit 310 is implemented as a computer system including, as its major components, a processor and a memory. In other words, a computer system, including a processor and a memory, functions as the control unit 310 by making the processor execute a program stored in the memory. The program may be stored in advance in the memory or may also be downloaded via a telecommunications line such as the Internet or distributed after having been stored on a non-transitory storage medium such as a memory card.

The control unit 310 also performs the function of the integrated map information generation unit 311. The integrated map information generation unit 311 generates integrated map information by integrating together pieces of map information that the communications unit 320 has received from the plurality of movers 10, i.e., pieces of map information generated by the respective map information generation units 21 of the plurality of movers 10. The integrated map information is obtained by integrating together pieces of map information generated by the plurality of movers 10. In each of the plurality of movers 10, the map information generation unit 21 generates map information for its own transmission range 50. The integrated map information generation unit 311 generates the integrated map information based on location information representing the respective current locations of the plurality of movers 10 and pieces of map information generated by the plurality of movers 10. For example, the integrated map information generation unit 311 may generate the integrated map information by arranging the pieces of map information generated by the plurality of movers 10 at coordinates corresponding to the respective current locations of the plurality of movers 10. Then, the control unit 310 has the integrated map information, generated by the integrated map information generation unit 311, transmitted from the communications unit 320, serving as integrated map information transmission unit, to the movers 10.

The integrated map information provided by the high-order system 300 serving as an external system is received by the respective communications units 9 (map information reception units) of the plurality of movers 10. In accordance with the integrated map information received by the communications unit 9, the control unit 2 of each of the plurality of movers 10 instructs the mover 10 to move accordingly. Since the movers 10A and 10B each restrict their own scanning wave transmission range 50A, 50B as described above, the map information obtained based on a result of detection by the object detecting unit 3 of its own mover 10 includes no information about a map outside of the transmission range 50A, 50B.

Figure 13:
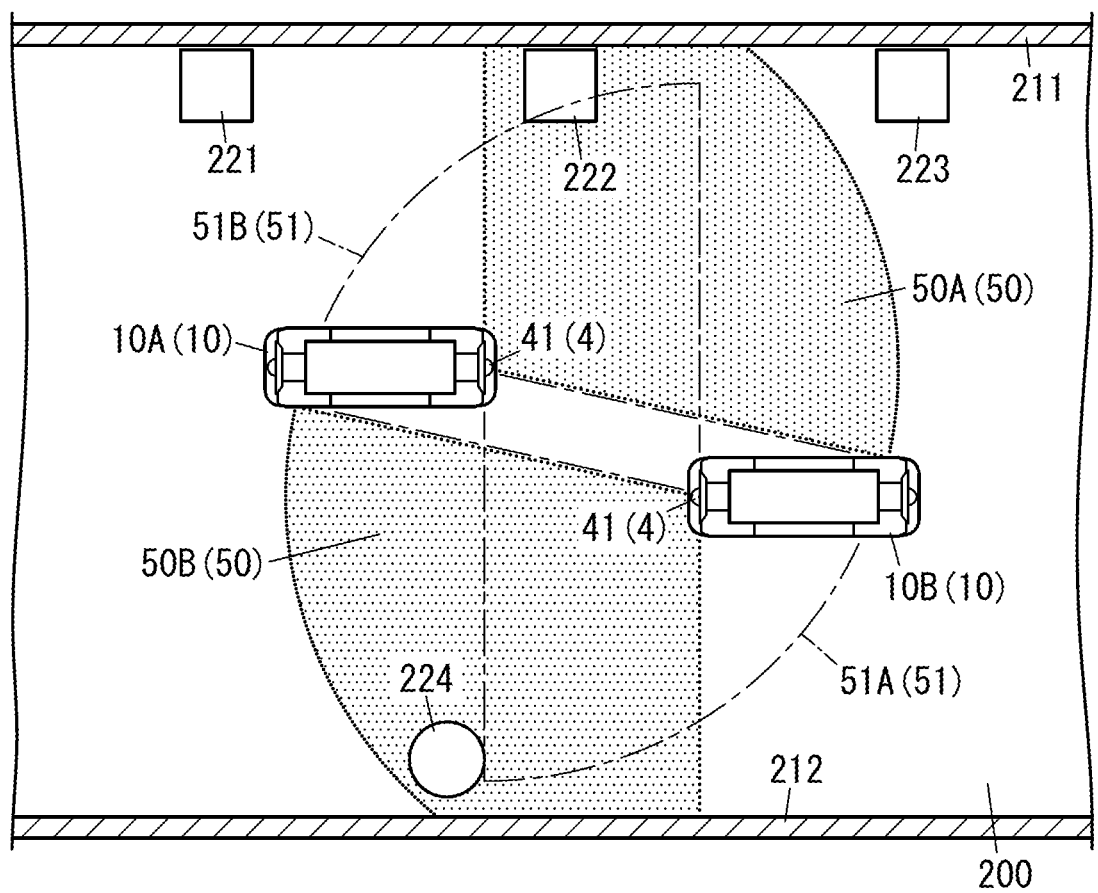
FIG. 13 illustrates a first example of how the mover may be used.

Reference is now made to FIG. 13, which illustrates a first example of how the movers 10A and 10B operate. In the example illustrated in FIG. 13, two movers 10A and 10B are traveling on the traveling surface 200 between two walls 211 and 212, and are moving toward each other in opposite directions such that each of the two movers 10A and 10B can see the other passing on its right. In other words, the movers 10A and 10B are each moving on the traveling surface 200 between the walls 211 and 212 so as to keep left with respect to their traveling direction. In this example, on the traveling surface 200 between the walls 211 and 212, three obstacles 221, 222, and 223 are arranged closer to the wall 211 and another obstacle 224 is arranged closer to the wall 212.

Since the mover 10B is now moving on the front right for the mover 10A, the mover 10A sets a front right range as the restricted range 51A. The mover 10A is unable to obtain map information about the front right range, or detect the location of the obstacle 224, based on only the result of detection by its own object detecting unit 3. Likewise, since the mover 10A is now moving on the front right for the mover 10B, the mover 10B also sets a front right range as the restricted range 51B. The mover 10B is unable to obtain map information about the front right range, or detect the location of the obstacle 222, based on only the result of detection by its own object detecting unit 3. In this third variation, the movers 10A and 10B receive the integrated map information from the high-order system 300 and are able to acquire the integrated map information obtained by integrating together the map information of the transmission range 50A of the mover 10A and the map information of the transmission range 50B of the mover 10B. In addition, the mover 10A moves in accordance with the integrated map information acquired from the high-order system 300. This allows the mover 10A to move in accordance with the integrated map information generated by the high-order system 300 and covering a range broader than the transmission range 50A of the mover 10A. Likewise, this also allows the mover 10B to move in accordance with the integrated map information generated by the high-order system 300 and covering a range broader than the transmission range 50B of the mover 10B.

In the mover 10 according to this third variation, the communications unit 9 serving as a map information transmission unit transmits the map information to the high-order system 300, and the communications unit 9 serving as a map information reception unit receives the integrated map information from the high-order system 300. This allows each of the movers 10A and 10B to acquire, from the high-order system 300, the integrated map information covering a range broader than their own transmission range 50A, 50B and move in accordance with the integrated map information while restricting the transmission range 50A, 50B in order to reduce the chances of causing detection errors.

Optionally, in this third variation, the respective communications units 9 of the plurality of movers 10 may communicate with each other. In each of the plurality of movers 10, the communications unit 9 (serving as a map information reception unit) may receive the map information generated by another mover 10 other than the mover 10. In that case, each mover 10 moves in accordance with integrated map information obtained by integrating together the map information generated by its own map information generation unit 21 and the map information received by the communications unit 9 (serving as a map information reception unit). This allows the mover 10 to move in accordance with the integrated map information covering a range broader than its own transmission range 50 while restricting the transmission range 50 in order to reduce the chances of causing detection errors.

(2.4.2) Other Variations

In the second embodiment and third variation described above, the transmitter unit 5 radiates a scanning wave as light (light wave), and a reflected wave (reflected light) reflected from an object is received, thus detecting the object. However, this is only an example and should not be construed as limiting. The scanning wave does not have to be light (light wave). The transmitter unit 5 may include a radar that transmits a radio wave such as a microwave or a millimeter wave. Alternatively, the transmitter unit 5 may include a sonar sensor that transmits an acoustic wave such as an ultrasonic wave.

In the second embodiment and third variation described above, in each of the plurality of movers 10, the transmission restricting unit 33 determines the transmission range 50 in accordance with information about the current location of another mover 10 other than the mover 10. However, this is only an example and should not be construed as limiting. Alternatively, the transmission range 50 may also be determined by the high-order system 300. Specifically, in that case, the control unit 310 of the high-order system 300 predicts, based pieces of information about the respective current locations of the plurality of movers 10, whether or not interference in scanning wave will occur between the plurality of movers 10. As used herein, a situation where interference occurs between scanning waves refers to a state where the scanning wave transmitted from one of the plurality of movers 10 is received by another of the plurality of movers 10. When predicting that interference will occur between the scanning waves, the control unit 310 generates restriction information that restricts the transmission range 50 in such a manner as to prevent the scanning wave from being received by another mover 10. Then, the control unit 310 has the restriction information transmitted from the communications unit 320 to that mover 10. In response, the transmission restricting unit 33 of the mover 10 restricts the transmission range 50 in accordance with the restriction information provided by the high-order system 300.

In the second embodiment and the third variation, when a plurality of (e.g., two) movers 10A, 10B are moving on the traveling surface 200, each of the plurality of movers 10 may restrict the scanning wave transmission range 50A, 50B to a predetermined range.

For example, when the movers 10A, 10B are each controlled to keep left with respect to the other mover while crossing each other on the traveling surface 200, the transmission range 50A, 50B may be restricted to a range on the left with respect to the traveling direction.

Also, if a traveling lane is determined in advance on the traveling surface 200 such that each of the plurality of movers 10 travels along its own lane, then the transmission range 50 of each of the plurality of movers 10 may be restricted to the traveling lane. For example, when the object detecting unit 3 of one mover 10 detects the presence of another mover 10 other than the mover 10, the control unit 2 of the one mover 10 may restrict the transmission range 50 to the traveling lane of the mover's 10.

In the second embodiment and the third variation, the transmission range 50A of one mover 10A is determined by evenly dividing the detection range of the object detecting unit 3 between the mover 10A and for at least one other mover 10B currently present in the detection range. As used herein, the detection range of the object detecting unit 3 refers to a maximum range in which the object is detectible in a state where the transmission range is not restricted by the transmission restricting unit 33. This allows each of the plurality of movers 10A, 10B to detect the object in their own transmission range 50A, 50B, which is defined by evenly dividing the detection range. However, this is only an example and should not be construed as limiting. Alternatively, the transmission range is changeable as appropriate.

Figure 14:
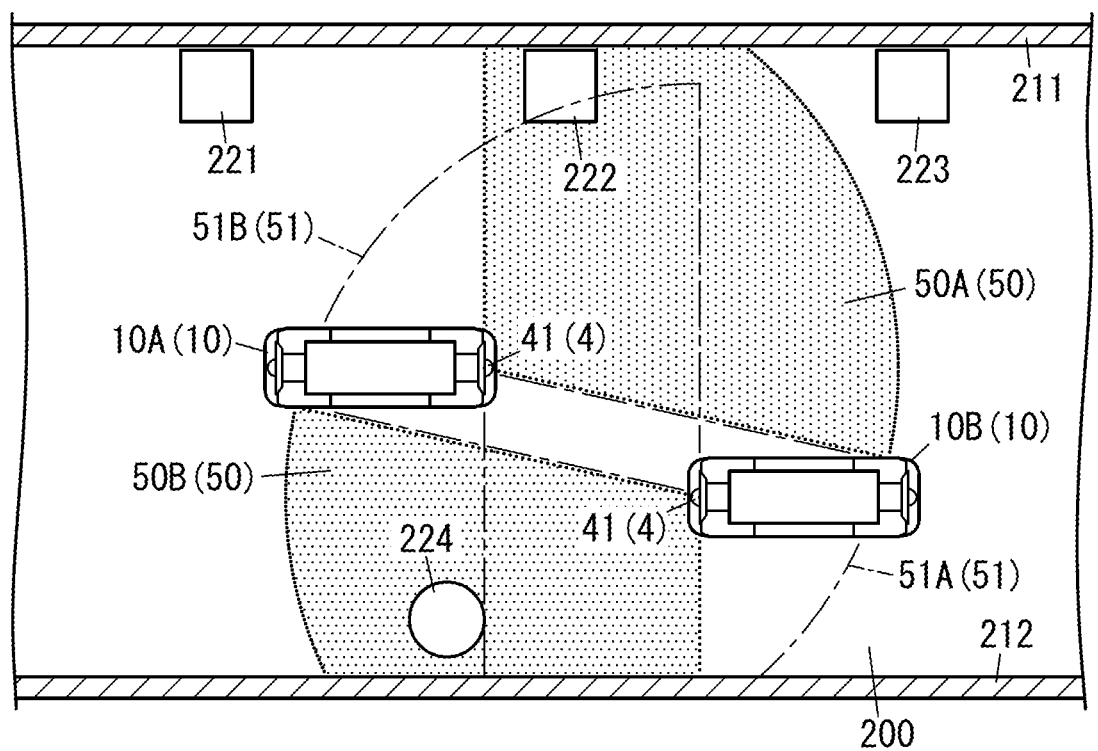
FIG. 14 illustrates a second example of how the mover may be used.

For example, as in a second example shown in FIG. 14, the transmission range 50A of one mover 10A may also be determined by unevenly dividing the detection range of the object detecting unit 3 between the mover 10A and for at least one other mover 10B currently present in the detection range. If the sensor units 4 employ different detection methods or have different detection characteristics in terms of detection range or sensitivity among the plurality of movers 10, then the best transmission range may be set for each of the plurality of movers 10 according to the detection characteristics of the sensor units 4.

Figure 15:
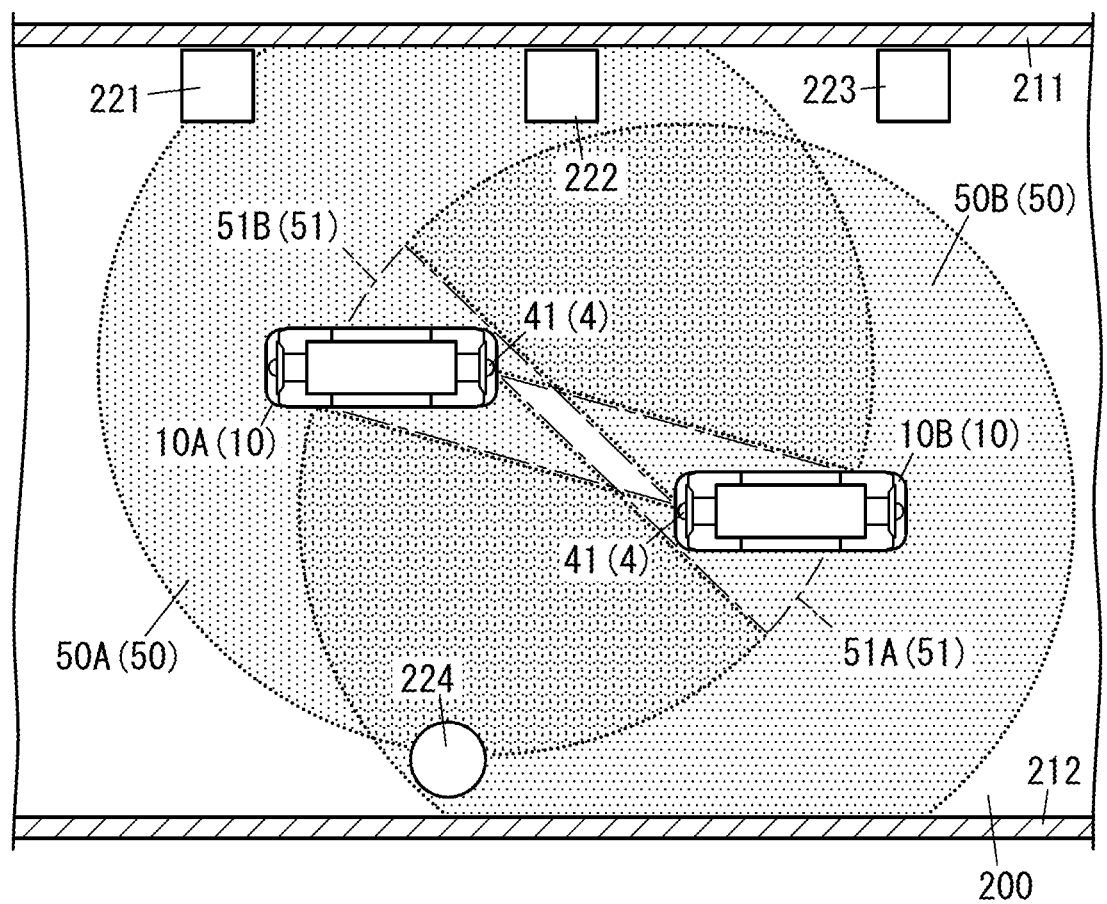
FIG. 15 illustrates a third example of how the mover may be used.

Optionally, as in a third example shown in FIG. 15, the sensor unit 41 of each mover 10 may also be configured to detect the object within a 360 degree range centered around the mover 10 on a plane parallel to the traveling surface 200. In that case, the transmission restricting unit 33 of one mover 10 may define a fan range, covering an area where another mover 10 is currently present, as the restricted range 51 and may set the transmission range 50 such that the restricted range 51 is not included in the transmission range 50.

In the second embodiment and the third variation, when the object detecting unit 3 detects the presence of another mover 10, each of the plurality of movers 10 makes the transmission restricting unit 33 restrict the transmission range 50. However, this is only an example and should not be construed as limiting. Alternatively, restriction of the transmission range 50 may also be triggered by any event other than the detection by the object detecting unit 3. For example, as soon as the communications unit 9 of one mover 10 receives a restriction request from either the high-order system 300 or another mover 10, the transmission restricting unit 33 of the mover 10 may restrict the transmission range 50 immediately.

Furthermore, in the second embodiment and the third variation, if there are a plurality of movers 10 around one mover 10, the transmission restricting unit 33 of the one mover 10 may set a plurality of restricted ranges 51, each of which covers an associated one of the plurality of movers 10 surrounding the mover 10. Then, the transmission restricting unit 33 of the mover 10 may set the transmission range 50 such that none of the plurality of restricted ranges 51 are included in the transmission range 50.

In the second embodiment described above, the control unit 2, the object detecting unit 3, and other components are built in the body 1. However, this is only an example and should not be construed as limiting. Alternatively, some functions of the control unit 2 and the object detecting unit 3 may be performed by the high-order system 300 with the ability to communicate with the body 1.

(Resume)

As can be seen from the foregoing description, a mover (10, 10A, 10B) according to a first aspect includes a body (1) configured to move around, and an object detecting unit (3). The mover (10, 10A, 10B) further includes an additional processing unit including either a masking processing unit (31) or a transmission restricting unit (33). The object detecting unit (3) is provided for the body (1) and detects an object based on a reception signal (S21, S22) supplied from a receiver unit (6) by having a transmitter unit (5) transmit a scanning wave and by having the receiver unit (6) receive a reflected wave. The reflected wave is a component, reflected from the object, of the scanning wave. The masking processing unit (31) performs masking processing of masking, in accordance with a timing at which, and/or a direction of incidence in which, a disturbance wave, not depending on the scanning wave, is incident on the receiver unit (6), a portion of the reception signal (S21, S22) output from the receiver unit (6). The transmission restricting unit (33) restricts a transmission range (50, 50A, 50B) in which the transmitter unit (5) transmits the scanning wave.

In a mover (10, 10A, 10B) according to a second aspect, which may be implemented in conjunction with the first aspect, the additional processing unit includes the transmission restricting unit (33). That is to say, a mover (10, 10A, 10B) according to the second aspect includes a body (1) configured to move around, and an object detecting unit (3). The object detecting unit (3) is provided for the body (1) and detects an object based on a reception signal (S21, S22) supplied from a receiver unit (6) by having a transmitter unit (5) transmit a scanning wave and by having the receiver unit (6) receive a reflected wave. The reflected wave is a component, reflected from the object, of the scanning wave. The object detecting unit (3) includes a masking processing unit (31). The masking processing unit (31) performs masking processing of masking, in accordance with a timing at which, and/or a direction of incidence in which, a disturbance wave, not depending on the scanning wave, is incident on the receiver unit (6), a portion of the reception signal (S21, S22) output from the receiver unit (6).

This aspect reduces the harmful effect of a disturbance wave by having the masking processing unit (31) mask a portion of the reception signal (S21, S22) in accordance with a timing at which, and/or a direction of incidence in which, the disturbance wave is incident on the receiver unit (6). This reduces the chances of detecting the object erroneously.

In a mover (10, 10A, 10B) according to a third aspect, which may be implemented in conjunction with the second aspect, the masking processing unit (31) performs the masking processing in accordance with the timing at which the disturbance wave is incident on the receiver unit (6).

This aspect reduces the harmful effect of a disturbance wave by having the masking processing unit (31) mask a portion of the reception signal (S21, S22) in accordance with a timing at which the disturbance wave is incident on the receiver unit (6).

In a mover (10, 10A, 10B) according to a fourth aspect, which may be implemented in conjunction with the second or third aspect, the masking processing unit (31) performs the masking processing in accordance with the direction of incidence in which the disturbance wave is incident on the receiver unit (6).

This aspect reduces the harmful effect of a disturbance wave by having the masking processing unit (31) mask a portion of the reception signal (S21, S22) in accordance with a direction of incidence in which the disturbance wave is incident on the receiver unit (6).

In a mover (10, 10A, 10B) according to a fifth aspect, which may be implemented in conjunction with any one of the second to fourth aspects, the portion of the reception signal (S21, S22) output from the receiver unit (6) includes a signal portion, corresponding to the disturbance wave, of the reception signal (S21, S22) that the receiver unit (6) outputs when receiving the disturbance wave, and the masking processing unit (31) masks the signal portion.

According to this aspect, when the receiver unit (6) receives a disturbance wave, the masking processing unit (31) masks a signal portion, corresponding to the disturbance wave, of the reception signal (S21, S22). This allows, even when the mover (10, 10A, 10B) is moving, the masking processing unit (31) to perform masking processing at the current location of the mover (10, 10A, 10B) in accordance with the disturbance wave incident on the receiver unit (6).

A mover (10, 10A, 10B) according to a sixth aspect, which may be implemented in conjunction with any one of the second to fifth aspects, further includes a masking information acquisition unit (32) configured to acquire masking information about the disturbance wave. The masking processing unit (31) performs the masking processing in accordance with the masking information.

This aspect allows the masking processing to be performed in accordance with the masking information that the masking information acquisition unit (32) has acquired from outside of the mover (10, 10A, 10B).

In a mover (10, 10A, 10B) according to a seventh aspect, which may be implemented in conjunction with the sixth aspect, the masking information is information about a scanning wave emitted from another mover (10, 10A, 10B) other than the mover (10, 10A, 10B).

This aspect allows the masking processing unit (31) of one mover (10, 10A, 10B) to perform the masking processing in accordance with information about a scanning wave emitted from another mover (10, 10A, 10B) other than the mover (10, 10A, 10B).

In a mover (10, 10A, 10B) according to an eighth aspect, which may be implemented in conjunction with the seventh aspect, the masking processing unit (31) determines, in accordance with the masking information, a timing to mask a portion of the reception signal (S21, S22) output from the receiver unit (6), and performs the masking processing in accordance with the timing determined.

This aspect allows the masking processing unit (31) of the mover (10, 10A, 10B) to determine the timing to mask the reception signal (S21, S22) and perform the masking processing in accordance with information about the scanning wave emitted from another mover (10, 10A, 10B).

In a mover (10, 10A, 10B) according to a ninth aspect, which may be implemented in conjunction with the seventh aspect, the masking processing unit (31) determines, in accordance with the masking information, a direction of incidence in which the disturbance wave is incident on the receiver unit (6), and performs the masking processing in accordance with the direction of incidence determined.

This aspect allows the masking processing unit (31) of the mover (10, 10A, 10B) to determine, in accordance with information about the scanning wave emitted from another mover (10, 10A, 10B), the direction of incidence in which the disturbance wave is incident and perform the masking processing.

In a mover (10, 10A, 10B) according to a tenth aspect, which may be implemented in conjunction with any one of the second to ninth aspects, the transmitter unit (5) transmits a light wave as the scanning wave, and the receiver unit (6) receives an incoming light wave including a reflected light wave. The reflected light wave is a component, reflected from the object, of the scanning wave.

This aspect reduces the chances of detecting the object erroneously in a situation where the transmitter unit (5) radiates a scanning light wave to detect the object.

In a mover (10, 10A, 10B) according to an eleventh aspect, which may be implemented in conjunction with any one of the second to tenth aspects, the body (1) moves on a traveling surface (200), and the transmitter unit (5) transmits the scanning wave within a plane that is parallel to the traveling surface (200).

This aspect reduces, even when the transmitter unit (5) transmits the scanning wave within a plane that is parallel to the traveling surface (200), the chances of detecting the object erroneously due to the disturbance to be caused by the scanning wave transmitted from another mover (10, 10A, 10B).

In a mover (10, 10A, 10B) according to a twelfth aspect, which may be implemented in conjunction with the eleventh aspect, the transmitter unit (5) transmits the scanning wave so as to scan the plane that is parallel to the traveling surface (200).

This aspect also reduces, even when the transmitter unit (5) transmits the scanning wave so as to scan the plane that is parallel to the traveling surface (200), the chances of detecting the object erroneously due to the disturbance to be caused by the scanning wave transmitted from another mover (10, 10A, 10B).

In a mover (10, 10A, 10B) according to a thirteenth aspect, which may be implemented in conjunction with any one of the second to twelfth aspects, the masking processing unit (31) masks a plurality of portions of the reception signal (S21, S22) output from the receiver unit (6).

This aspect also reduces, even when there are a plurality of disturbance waves, the chances of detecting the object erroneously due to the presence of those disturbance waves.

A mover control system (100) according to a fourteenth aspect includes a plurality of the movers (10, 10A, 10B) according to any one of the second to thirteenth aspects. The mover control system (100) further includes a transmission device (20) configured to transmit masking information including location information about locations of the plurality of movers (10, 10A, 10B) to each of the plurality of the movers (10, 10A, 10B). The masking processing unit (31) of each of the plurality of the movers (10, 10A, 10B) masks, in accordance with the location information, a portion of the reception signal (S21, S22) output from the receiver unit (6).

This aspect allows the masking processing to be performed in accordance with the masking information that the masking information acquisition unit (32) of each of the plurality of movers (10, 10A, 10B) has acquired from the transmission device (20).

A method of detecting an object by a mover (10, 10A, 10B) according to a fifteenth aspect is a method for detecting an object by a mover (10, 10A, 10B) that moves around in an object space, surrounding the mover (10, 10A, 10B), to detect the object. The method includes: making a transmitter unit (5) transmit a scanning wave; making a receiver unit (6) receive an incident wave and output a reception signal (S21, S22) representing the incident wave; masking, in accordance with a timing at which, and/or a direction of incidence in which, a disturbance wave, not depending on the scanning wave, is incident on the receiver unit (6), a portion of the reception signal (S21, S22) output from the receiver unit (6); and detecting the object based on the reception signal (S21, S22) that has had a portion thereof masked.

This aspect reduces the chances of detecting the object erroneously.

A program according to a sixteenth aspect is designed to make a computer system execute: making a transmitter unit (5) transmit a scanning wave; receiving a reception signal (S21, S22) from a receiver unit (6) configured to output the reception signal (S21, S22) representing an incident wave; masking, in accordance with a timing at which, and/or a direction of incidence in which, a disturbance wave, not depending on the scanning wave, is incident on the receiver unit (6), a portion of the reception signal (S21, S22) output from the receiver unit (6); and detecting an object based on the reception signal (S21, S22) that has had a portion thereof masked.

This aspect reduces the chances of detecting the object erroneously.

In a mover (10, 10A, 10B) according to a seventeenth aspect, which may be implemented in conjunction with the first aspect, the additional processing unit includes the transmission restricting unit (33). That is to say, a mover (10, 10A, 10B) according to the seventeenth aspect includes a body (1) configured to move around, an object detecting unit (3) provided for the body (1), and the transmission restricting unit (33). The object detecting unit (3) detects an object by having a transmitter unit (5) transmit a scanning wave and by having the receiver unit (6) receive a reflected wave. The reflected wave is a component, reflected from the object, of the scanning wave. The transmission restricting unit (33) restricts a transmission range (50, 50A, 50B) in which the transmitter unit (5) transmits the scanning wave.

The mover (10, 10A, 10B) according to this aspect allows the scanning wave transmission range (50, 50A, 50B) to be restricted by the transmission restricting unit (33). This reduces the chances of the scanning wave, transmitted from the transmitter unit (5) of the mover (10, 10A, 10B), being received by another mover (10, 10A, 10B) located outside of the transmission range (50, 50A, 50B) of the mover itself (10, 10A, 10B). Consequently, this reduces the chances of the mover (10, 10A, 10B) detecting the object erroneously.

A mover (10, 10A, 10B) according to an eighteenth aspect, which may be implemented in conjunction with the seventeenth aspect, further includes an acquisition unit (34) configured to acquire, from outside of the mover, restriction information about a restricted range (51, 51A, 51B) in which the scanning wave is not to be transmitted. The transmission restricting unit (33) restricts, in accordance with the restriction information, the transmission range (50, 50A, 50B) in which the transmitter unit (5) transmits the scanning wave.

This aspect allows the transmission restricting unit (33) to restrict the transmission range (50, 50A, 50B) in accordance with the restriction information acquired from outside of the mover (10, 10A, 10B).

In a mover (10, 10A, 10B) according to a nineteenth aspect, which may be implemented in conjunction with the eighteenth aspect, the restricted range (51, 51A, 51B) is a range covering a location where another mover (10, 10A, 10B), other than the mover (10, 10A, 10B), is present.

This aspect allows the transmission restricting unit (33) to restrict the transmission range (50, 50A, 50B) in accordance with the restriction information acquired from outside of the mover (10, 10A, 10B).

A mover (10, 10A, 10B) according to a twentieth aspect, which may be implemented in conjunction with any one of the seventeenth to nineteenth aspects, further includes a map information generation unit (21) and a map information transmission unit (9). The map information generation unit (21) generates, based on a result of detection by the object detecting unit (3), map information for the transmission range (50, 50A, 50B). The map information transmission unit (9) transmits the map information, generated by the map information generation unit (21), to outside of the mover (10, 10A, 10B).

This aspect allows an external device or system, configured to receive map information from the mover (10, 10A, 10B), to use the map information generated by the map information generation unit (21).

A mover (10, 10A, 10B) according to a twenty-first aspect, which may be implemented in conjunction with the twentieth aspect, further includes a map information reception unit (9) configured to receive integrated map information provided from outside of the mover (10, 10A, 10B). The integrated map information is obtained by integrating the map information generated by the map information generation unit (21) with map information generated by another mover (10, 10A, 10B) other than the mover (10, 10A, 10B). The mover (10, 10A, 10B) moves in accordance with the integrated map information received by the map information reception unit (9).

This aspect allows the mover (10, 10A, 10B) to move in accordance with not only the map information generated by the map information generation unit (21) but also the map information generated by another mover (10, 10A, 10B) other than the mover (10, 10A, 10B).

In a mover (10, 10A, 10B) according to a twenty-second aspect, which may be implemented in conjunction with the twenty-first aspect, the map information transmission unit (9) transmits the map information to a high-order system (300), and the map information reception unit (9) receives the integrated map information from the high-order system (300).

This aspect allows the mover (10, 10A, 10B) to move in accordance with the integrated map information generated by the high-order system (300) and covering a range broader than the transmission range (50, 50A, 50B) of the mover (10, 10A, 10B).

A mover (10, 10A, 10B) according to a twenty-third aspect, which may be implemented in conjunction with the twentieth aspect, further includes a map information reception unit (9). The map information reception unit (9) receives map information generated by another mover (10, 10A, 10B) other than the mover (10, 10A, 10B). The mover (10, 10A, 10B) moves in accordance with integrated map information obtained by integrating the map information generated by the map information generation unit (21) with the map information received by the map information reception unit (9).

According to this aspect, the map information reception unit (9) of the mover (10, 10A, 10B) acquires map information from another mover (10, 10A, 10B) other than the mover (10, 10A, 10B). The map information provided by the other mover (10, 10A, 10B) other than the mover (10, 10A, 10B) contains information about a range outside of the transmission range (50, 50A, 50B) of the latter mover (10, 10A, 10B). This allows the mover (10, 10A, 10B) to move in accordance with the integrated map information covering a broader range.

In a mover (10, 10A, 10B) according to a twenty-fourth aspect, which may be implemented in conjunction with any one of the seventeenth to twenty-third aspects, the transmission range (50, 50A, 50B) is a predetermined range.

This aspect reduces the chances of causing detection errors.

In a mover (10, 10A, 10B) according to a twenty-fifth aspect, which may be implemented in conjunction with any one of the seventeenth to twenty-third aspects, the transmission range (50, 50A, 50B) is determined by a first division method. According to the first division method, the detection range for the object detecting unit (3) is evenly divided between the mover (10, 10A, 10B) and one or more other movers (10, 10A, 10B) present within the same detection range as the mover (10, 10A, 10B).

This aspect reduces the chances of causing detection errors.

In a mover (10, 10A, 10B) according to a twenty-sixth aspect, which may be implemented in conjunction with any one of the seventeenth to twenty-third aspects, the transmission range (50, 50A, 50B) is determined by a second division method. According to the second division method, the detection range for the object detecting unit (3) is unevenly divided between the mover (10, 10A, 10B) and one or more other movers (10, 10A, 10B) present within the same detection range as the mover (10, 10A, 10B).

This aspect reduces the chances of causing detection errors.

A moving system (100A) according to a twenty-seventh aspect includes the plurality of movers (10, 10A, 10B) and a high-order system (300). Each of the plurality of movers (10, 10A, 10B) includes a body (1) configured to move around, an object detecting unit (3) provided for the body (1), a transmission restricting unit (33), a map information generation unit (21), a map information transmission unit (9), and a map information reception unit (9). The object detecting unit (3) is configured to detect an object by having a transmitter unit (5) transmit a scanning wave and by having the receiver unit (6) receive a reflected wave. The reflected wave is a component, reflected from the object, of the scanning wave. The transmission restricting unit (33) is configured to restrict a transmission range (50, 50A, 50B) in which the transmitter unit (5) transmits the scanning wave. The map information generation unit (21) generates, based on a result of detection by the object detecting unit (3), map information for the transmission range (50, 50A, 50B). The map information transmission unit (9) transmits the map information, generated by the map information generation unit (21), to the high-order system (300). The map information reception unit (9) receives, from the high-order system (300), integrated map information. The integrated map information is obtained by integrating the map information generated by the map information generation unit (21) with the map information generated by another mover (10, 10A, 10B) other than the mover (10, 10A, 10B). The high-order system (300) includes an integrated map information generation unit (311) and an integrated map information transmission unit (320). The integrated map information generation unit (311) generates the integrated map information by integrating together pieces of map information generated by the respective map information generation units (21) of the plurality of movers (10, 10A, 10B). The integrated map information transmission unit (320) transmits the integrated map information generated by the integrated map information generation unit (311) to the plurality of movers (10, 10A, 10B). The mover (10, 10A, 10B) moves in accordance with the integrated map information received by the map information reception unit (9).

This aspect reduces the chances of causing detection errors by making the transmission restricting unit (33) of the mover (10, 10A, 10B) restrict the transmission range (50, 50A, 50B). In addition, the mover (10, 10A, 10B) moves in accordance with the integrated map information, which is generated by integrating together pieces of map information of a plurality of movers (10, 10A, 10B). This allows the mover (10, 10A, 10B) to move in accordance with the integrated map information covering a range outside of the transmission range of the mover (10, 10A, 10B).

A method for controlling a mover (10, 10A, 10B) according to a twenty-eighth aspect includes: determining a transmission range (50, 50A, 50B), in which a transmitter unit (5) transmits a scanning wave, so as to restrict the transmission range (50, 50A, 50B); making the transmitter unit (5) transmit the scanning wave to the transmission range (50, 50A, 50B); and detecting an object by making a receiver unit (6) receive a reflected wave, which is a component, reflected from the object, of the scanning wave.

This aspect allows a scanning wave transmission range (50, 50A, 50B) to be determined in the step of determining the transmission range (50, 50A, 50B) such that the transmission range (50, 50A, 50B) is restricted. This reduces the chances of the scanning wave, transmitted from the transmitter unit (5) of the mover (10, 10A, 10B), being received by another mover (10, 10A, 10B) located outside of the transmission range (50, 50A, 50B) of the former mover (10, 10A, 10B), thus reducing the chances of the mover (10, 10A, 10B) causing detection errors.

A program according to a twenty-ninth aspect is designed to make a computer system execute: determining a transmission range (50, 50A, 50B), in which a transmitter unit (5) transmits a scanning wave, so as to restrict the transmission range (50, 50A, 50B); making the transmitter unit (5) transmit the scanning wave to the transmission range (50, 50A, 50B); and detecting an object by making a receiver unit (6) receive a reflected wave, which is a component, reflected from the object, of the scanning wave.

This aspect allows a scanning wave transmission range (50, 50A, 50B) to be determined in the step of determining the transmission range (50, 50A, 50B) such that the transmission range (50, 50A, 50B) is restricted. This reduces the chances of the scanning wave, transmitted from the transmitter unit (5) of the mover (10, 10A, 10B), being received by another mover (10, 10A, 10B) located outside of the transmission range (50, 50A, 50B) of the former mover (10, 10A, 10B), thus reducing the chances of the mover (10, 10A, 10B) causing detection errors.

Note that these aspects are only exemplary aspects of the present disclosure. That is to say, the present disclosure has many other aspects that have not been mentioned above. For example, various configurations of the mover (10, 10A, 10B) according to the first or second embodiment described above may also be implemented as, for example, a method of detecting an object by a mover (10, 10A, 10B) in a different way, a (computer) program, and a non-transitory storage medium that stores the program thereon. Note that the configurations according to the second to thirteenth aspects and the seventeenth to twenty-sixth aspects are not essential constituent elements of the mover (10, 10A, 10B) but may be omitted as appropriate.

In the mover according to the first embodiment and variations thereof, the masking processing unit performs masking processing of masking, in accordance with a timing at which, and/or a direction of incidence in which, a disturbance wave, not depending on the scanning wave, is incident on the receiver unit, a portion of the reception signal output from the receiver unit. As used herein, the "portion of the reception signal output from the receiver unit" may refer to a signal portion during a certain period (e.g., signal portions during the masking period t11 as shown in FIG. 4) and may also refer to a signal portion corresponding to a certain incident angle range (e.g., a signal portion, corresponding to the incident angle range A1 determined in accordance with the direction of incidence of the disturbance light, of the reception signal S21 output from the receiver unit 6).

What is claimed is:

1. A mover comprising:
   a body configured to move around;
   an object detecting unit provided for the body and configured to detect an object based on a reception signal output from a receiver unit by having a transmitter unit transmit a scanning wave and by having the receiver unit receive a reflected wave, the reflected wave being a component, reflected from the object, of the scanning wave; and
   an additional processing unit including a masking processing unit, the masking processing unit being configured to perform masking processing of masking, in accordance with a timing at which, and/or a direction of incidence in which, a disturbance wave, not depending on the scanning wave, is incident on the receiver unit, a portion of the reception signal output from the receiver unit.

2. The mover of claim 1, wherein
   the portion of the reception signal output from the receiver unit includes a signal portion, corresponding to the disturbance wave, of the reception signal that the receiver unit outputs when receiving the disturbance wave, and
   the masking processing unit masks the signal portion.

3. The mover of claim 1, further comprising a masking information acquisition unit configured to acquire masking information about the disturbance wave, wherein
   the masking processing unit performs the masking processing in accordance with the masking information.

4. The mover of claim 3, wherein
   the masking information is information about a scanning wave emitted from another mover other than the mover.

5. The mover of claim 1, wherein
   the masking processing unit masks a plurality of portions of the reception signal output from the receiver unit.

6. The mover of claim 1, wherein
   the transmitter unit transmits a light wave as the scanning wave, and
   the receiver unit receives an incoming light wave including a reflected light wave, the reflected light wave being a component, reflected from the object, of the scanning wave.

7. The mover of claim 1, wherein
   the body moves on a traveling surface, and
   the transmitter unit transmits the scanning wave within a plane that is parallel to the traveling surface.

8. The mover of claim 7, wherein
   the transmitter unit transmits the scanning wave so as to scan the plane that is parallel to the traveling surface.

9. A mover control system comprising:
a plurality of the movers of claim 1; and
a transmission device configured to transmit masking information, including location information about locations of the plurality of movers, to each of the plurality of the movers,
the masking processing unit of each of the plurality of the movers masking, in accordance with the location information, a portion of the reception signal output from the receiver unit thereof.

10. A method of detecting an object by a mover, the mover moving around in an object space, surrounding the mover, to detect the object, the method comprising:
making a transmitter unit transmit a scanning wave;
making a receiver unit receive an incident wave and output a reception signal representing the incident wave;
masking, in accordance with a timing at which, and/or a direction of incidence in which, a disturbance wave, not depending on the scanning wave, is incident on the receiver unit, a portion of the reception signal output from the receiver unit; and
detecting the object based on the reception signal that has had a portion thereof masked.

11. The mover of claim 1, wherein
the additional processing unit further includes a transmission restricting unit, the transmission restricting unit being configured to restrict a transmission range in which the transmitter unit transmits the scanning wave.

12. The mover of claim 11, further comprising an acquisition unit configured to acquire, from outside of the mover, restriction information about a restricted range in which the scanning wave is not to be transmitted, wherein
the transmission restricting unit restricts, in accordance with the restriction information, the transmission range in which the transmitter unit transmits the scanning wave.

13. The mover of claim 12, wherein
the restricted range is a range covering a location where another mover, other than the mover, is present.

14. The mover of claim 11, further comprising:
a map information generation unit configured to generate, based on a result of detection by the object detecting unit, map information for the transmission range; and
a map information transmission unit configured to transmit the map information, generated by the map information generation unit, to outside of the mover.

15. The mover of claim 14, further comprising a map information reception unit configured to receive integrated map information provided from outside of the mover, wherein
the integrated map information is obtained by integrating the map information generated by the map information generation unit with map information generated by another mover other than the mover, and
the mover moves in accordance with the integrated map information received by the map information reception unit.

16. The mover of claim 15, wherein
the map information transmission unit transmits the map information to a high-order system, and
the map information reception unit receives the integrated map information from the high-order system.

17. The mover of claim 14, further comprising a map information reception unit configured to receive map information generated by another mover other than the mover, wherein the mover moves in accordance with integrated map information obtained by integrating the map information generated by the map information generation unit with the map information received by the map information reception unit.

18. A moving system comprising:
the plurality of the movers of claim 11; and
a high-order system,
each of the plurality of movers further including:
a map information generation unit configured to generate, based on a result of detection by the object detecting unit, map information for the transmission range;
a map information transmission unit configured to transmit the map information, generated by the map information generation unit, to the high-order system; and
a map information reception unit configured to receive, from the high-order system, integrated map information obtained by integrating the map information generated by the map information generation unit with map information generated by another one of the plurality of movers other than each said mover,
the high-order system including:
an integrated map information generation unit configured to generate the integrated map information by integrating together pieces of map information generated by the respective map information generation units of the plurality of movers; and
an integrated map information transmission unit configured to transmit the integrated map information generated by the integrated map information generation unit to the plurality of movers,
the mover moving in accordance with the integrated map information received by the map information reception unit.

19. A mover control method for controlling the mover of claim 11 comprising:
determining a transmission range, in which a transmitter unit transmits a scanning wave, so as to restrict the transmission range;
making the transmitter unit transmit the scanning wave to the transmission range; and
detecting an object by making a receiver unit receive a reflected wave, the reflected wave being a component, reflected from the object, of the scanning wave.

20. A mover comprising:
a body configured to move around;
an object detecting unit provided for the body and configured to detect an object based on a reception signal output from a receiver unit by having a transmitter unit transmit a scanning wave and by having the receiver unit receive a reflected wave, the reflected wave being a component, reflected from the object, of the scanning wave; and
an additional processing unit including either:
a masking processing unit configured to perform masking processing of masking a portion of the reception signal output from the receiver unit in accordance with a timing at which, and/or a direction of incidence in which, a disturbance wave, not depending on the scanning wave, is incident on the receiver unit, or
a transmission restricting unit configured to restrict a transmission range in which the transmitter unit transmits the scanning wave.

21. The mover of claim 1, wherein
the timing for the masking processing includes a time period during which the transmitter unit is configured to transmit the scanning wave.
22. The mover of claim 1, wherein
the direction of incidence for the masking processing is a direction of receiving the reflected wave in a range of angles that have a difference from an angle of transmitting the scanning wave more than a threshold value.

* * * * *